(12) United States Patent
Tencza et al.

(10) Patent No.: US 12,485,945 B2
(45) Date of Patent: Dec. 2, 2025

(54) RUGGED INDOOR/OUTDOOR TELEVISION CART

(71) Applicant: Bretford Manufacturing, Inc., Franklin Park, IL (US)

(72) Inventors: Zachary Tencza, Franklin Park, IL (US); John Sadler, Des Plaines, IL (US); Daniel Berger, Madison, AL (US); Cory Doppelt, Palatine, IL (US); Cary Maguire, Chicago, IL (US)

(73) Assignee: Bretford Manufacturing, Inc., Franklin Park, IL (US)

( * ) Notice: Subject to any disclaimer, the term of this patent is extended or adjusted under 35 U.S.C. 154(b) by 270 days.

(21) Appl. No.: 18/386,648

(22) Filed: Nov. 3, 2023

(65) Prior Publication Data

US 2024/0149932 A1    May 9, 2024

Related U.S. Application Data

(63) Continuation-in-part of application No. 29/896,623, filed on Jul. 6, 2023, now Pat. No. Des. 1,068,747.

(Continued)

(51) Int. Cl.
*B62B 3/04* (2006.01)
*B62B 3/10* (2006.01)
(Continued)

(52) U.S. Cl.
CPC .............. *B62B 3/04* (2013.01); *B62B 3/108* (2013.01); *B62B 5/06* (2013.01); *H02J 7/0063* (2013.01);
(Continued)

(58) Field of Classification Search
CPC .. B62B 3/04; B62B 3/108; B62B 3/10; B62B 5/06; B62B 2202/56; H02J 7/0063; H02J 7/02; H02J 2207/20
See application file for complete search history.

(56) References Cited

U.S. PATENT DOCUMENTS

| 4,719,513 A | 1/1988 | Peterson |
| 4,755,881 A | 7/1988 | Bartlett |

(Continued)

FOREIGN PATENT DOCUMENTS

| CA | 3129518 A1 * | 8/2020 | .......... B67D 1/0857 |
| CN | 104702884 A * | 6/2015 | |

(Continued)

OTHER PUBLICATIONS

"The Coach Caddy", School Logo Furniture, schoollogofurniture.com, 9/22/20https://web.archive.org/web/20200922230809/https://www.schoollogofurniture.com/coach-caddys.

(Continued)

*Primary Examiner* — John D Walters
(74) *Attorney, Agent, or Firm* — Anderson Gorecki LLP

(57) ABSTRACT

A rugged indoor/outdoor television cart has four large castors supported on four legs that extend upward from the castors and radially inward toward a base. Two vertical uprights are connected to the base. A bracket mounting system connects a television to the vertical uprights and enables an angle of television screen to be adjusted relative to the vertical uprights. Television mounting and stabilizing bars are provided that are connected to the bracket mounting system and have top and bottom claws to engage top and bottom edges of the television. The television mounting and stabilizing bars reduce the amount of stress from being transferred to the VESA mounting connection points on the interior of the television as the television cart is moved over uneven surfaces. A battery power system is optionally provided to provide power to the television when the television cart is not connected to an external source of power.

15 Claims, 17 Drawing Sheets

Related U.S. Application Data

(60) Provisional application No. 63/422,945, filed on Nov. 5, 2022.

(51) Int. Cl.
  *B62B 5/06* (2006.01)
  *H02J 7/00* (2006.01)
  *H02J 7/02* (2016.01)

(52) U.S. Cl.
  CPC ............ *H02J 7/02* (2013.01); *B62B 2202/56* (2013.01); *H02J 2207/20* (2020.01)

(56) References Cited

U.S. PATENT DOCUMENTS

| | | | |
|---|---|---|---|
| 5,351,976 | A | 10/1994 | Penson |
| 6,493,217 | B1 | 12/2002 | Jenkins, Jr. |
| 6,722,673 | B1 | 4/2004 | Hamlin |
| 7,114,732 | B1 | 10/2006 | Ismail |
| D539,794 | S | 4/2007 | Rossini et al. |
| 7,621,544 | B2 | 11/2009 | Rossini |
| D626,354 | S | 11/2010 | Lau et al. |
| 7,832,694 | B2 | 11/2010 | German et al. |
| 7,963,533 | B2 | 6/2011 | Bothun et al. |
| 8,162,330 | B2 | 4/2012 | Melkumyan et al. |
| 8,210,548 | B1 | 7/2012 | Agyemang |
| 8,227,943 | B2 * | 7/2012 | Harbin ............ H02J 7/0045 361/601 |
| D671,703 | S | 11/2012 | Guasta et al. |
| 8,696,075 | B1 | 4/2014 | Rios |
| 8,857,828 | B1 | 10/2014 | San |
| 9,705,359 | B2 * | 7/2017 | Boyd ............ H01M 10/0525 |
| D821,371 | S * | 6/2018 | Heckler ............ D14/239 |
| 10,253,923 | B2 | 4/2019 | Heckler |
| D858,927 | S | 9/2019 | Wolford et al. |
| 10,412,853 | B2 | 9/2019 | Dombrowski et al. |
| 10,617,299 | B2 | 4/2020 | Sanchez et al. |
| 11,076,687 | B2 * | 8/2021 | Blewett ............ B62B 3/12 |
| D1,038,093 | S * | 8/2024 | Hong ............ D14/239 |
| 12,283,701 | B2 * | 4/2025 | Alobaidi ............ H01M 50/502 |
| 2003/0128507 | A1 | 7/2003 | Metcalf |
| 2006/0028177 | A1 | 2/2006 | Ferro et al. |
| 2006/0228201 | A1 | 10/2006 | Lenceski |
| 2007/0228680 | A1 | 10/2007 | Reppert et al. |
| 2011/0272901 | A1 | 11/2011 | Inderbitzin |
| 2015/0097348 | A1 | 4/2015 | Steinfels et al. |
| 2015/0187231 | A1 | 7/2015 | Stephanian |
| 2016/0015455 | A1 | 1/2016 | Wu et al. |
| 2017/0005512 | A1 | 1/2017 | Boyd |
| 2019/0270469 | A1 | 9/2019 | Yokoyama et al. |

FOREIGN PATENT DOCUMENTS

| | | |
|---|---|---|
| WO | WO 9202160 A1 | 2/1992 |
| WO | WO 2015113670 A1 | 8/2015 |

OTHER PUBLICATIONS

"Mobile/Rolling TV Cart with Wheels, UL Certificated Outdoor/Floor TV Stand" Amazon, amazon.com, ASIN: B0928B4YV4, Date First Available: Apr. 12, 2021https://www.amazon.com/Mobile-TV-Cart-Wheels-Certificated/dp/B0928B4YV4.

"Introducing SlimCart: Change the Way You See the Game", InstaClinic,instaclinic.orghttps://web.archive.org/web/20200217060434/http://instaclinic.org/slim-cart.php.

* cited by examiner

RUGGED INDOOR/OUTDOOR TELEVISION CART

CROSS-REFERENCE TO RELATED APPLICATIONS

This application claims priority to provisional application No. 63/442,945, filed Nov. 5, 2022, entitled Rugged Outdoor Television Cart, the content of which is hereby incorporated herein by reference. This application also claims priority to design patent application number 29/896,623, entitled "Television Cart", filed Jul. 6, 2023, the content of which is hereby incorporated herein by reference.

FIELD

The present invention relates to mobile television carts and, more particularly, to a rugged indoor/outdoor television cart designed to be able to be moved within a training facility as well as to be moved out onto an athletic field.

SUMMARY

All examples and features mentioned below can be combined in any technically possible way.

Television carts provide the ability to move a television within a complex, such as between rooms of an educational facility. Television carts that are designed to be used indoors tend to have relatively small castors that are designed to roll on a smooth surface, such as on a linoleum, tile, or cement floor. The television mounts connect to the VESA connectors on the television, which often are formed in a plastic casing on the back of the television. In instances where a conventional television cart is to be moved outside of a building, the small casters make it difficult to navigate uneven surfaces such over uneven surfaces, such as artificial turf, grass, chipped or broken sidewalks, transoms, off curbs, dirt paths, grass, etc. Additionally, the manner in which the television is connected to the television cart can enable the television to shake, thus jeopardizing the integrity of the mounting system on the television. Since large size televisions can be quite heavy, for example on the order of 100 pounds, maintaining the integrity of the television mounting system is important.

According to some embodiments, a rugged indoor/outdoor television cart is provided that is designed to be able to be moved within a training facility as well as to be moved outdoors, for example from an athletic facility onto an athletic field. The rugged indoor/outdoor television cart includes large casters that facilitate movement of the cart over uneven terrain. The large casters also smooth out the bumps to thereby reduce the amount of stress imparted on the television as the rugged indoor/outdoor television cart encounters uneven surfaces. In some embodiments, television mounting and stabilizing bars are provided to support the television and connect the television to the rugged indoor/outdoor television cart. By providing television mounting and stabilizing bars, the movement of the television relative to the support is minimized, particularly when the rugged indoor/outdoor television cart is moved over uneven surfaces such as rough sidewalks or grass. By using television mounting and stabilizing bars to reduce movement of the television relative to the rugged indoor/outdoor television cart, it is possible to help maintain the integrity of the television mounting system, because the amount of stress induced on the television mounting system is transferred to the television mounting and stabilizing bars rather than only to the VESA mount points on the back of the television.

In some embodiments, the television mounting and stabilizing bars are designed to hold the television and provide a secondary mount for the television which will prevent the television from falling in the event of a failure of the primary VESA mounting system. The television mounting and stabilizing bars also provide support to help distribute torque or other loads on the television that may be induced, for example in instances where the rugged indoor/outdoor television cart is being used in a windy environment.

In some embodiments, the rugged indoor/outdoor television cart includes a battery power system to power the television so that the rugged indoor/outdoor television cart is not required to be continuously connected to an external source of power while in use. The battery of the battery power system may be implemented, for example, using a 1000-watt-hour battery that is connected to an inverter configured to provide AC power to the television. In some embodiments, the battery is rechargeable and configured to be recharged when the rugged indoor/outdoor television cart is connected to an external source of power.

In some embodiments, the battery is removable from the rugged indoor/outdoor television cart to enable a fully charged battery to be swapped into the cart for a lesser charged battery, and to allow the battery to be recharged outside of the cart as well. In some embodiments, a small reserve battery is included inside the cart that is not removable, that will allow the television to continue to run for a short (e.g., 3 minute) period of time to allow continued use of the TV during the battery swap operation.

In embodiments where the battery is removable, in some instances an external battery charger system is provided to enable the battery to be charged while removed from the rugged indoor/outdoor television cart. For example, a two-battery floor mounted battery charging system may be provided and configured to include two sets of contacts, each set of electrical contacts being configured and arranged to electrically engage a respective set of electrical contacts of a respective battery. The floor mounted batter charging system, in some embodiments, includes an AC-DC power supply to receive mains power from an electrical outlet and provide 12V DC power to charge the batteries while the batteries are inserted in the electrical charger and are not fully electrically charged.

In some embodiments, the rugged indoor/outdoor television cart has a base with four legs. Each leg is connected on one end to one of the large casters which, in some embodiments, are on the order of 8 inches in diameter. Each leg extends upward at an angle relative to the end that connects to the caster, to provide additional ground clearance between a base of the rugged indoor/outdoor television cart and the ground. In some embodiments, an angle between the leg and the ground is in a range of approximately between 20 and 45 degrees. In some embodiments, the angle between the leg and the ground is in a range of approximately between 25 and 35 degrees. In some embodiments the angle between the leg and the ground is approximately 30 degrees, when rounding to the nearest two degrees. Having the legs extend upward from the castors toward the base at an angle relative to the ground facilitates movement of the rugged indoor/outdoor television cart over obstacles, and over uneven ground such as when the rugged indoor/outdoor television cart is maneuvered on/off a sidewalk or over a curb.

In some embodiments, one or more handles are provided, such as on the base to lift the rugged indoor/outdoor television cart and at waist level to enable the cart to be pushed and pulled.

A bracket mounting system enables the angle of the television to be adjusted from a vertical position to a partially downward facing angle. In some embodiments, the bracket mounting system enables the front of the television to be angled downward by up to approximately 10-15 degrees. Enabling the television to be angled downward can be useful, in particular circumstances, for example to reduce an amount of glare or reflection resulting from use of the television outdoors in bright sunlight or from stadium floodlights. In some embodiments, the bracket mounting system includes connection points to accommodate electronic equipment such as a WiFi modem or other networking electronic equipment.

In some embodiments, the rugged indoor/outdoor television cart includes a sun shade that connects to the top of vertical upright members and extends above the top edge of the television and horizontally out in front of the front surface of the television. The sun shade, in some embodiments, is designed to stow along the back side of the vertical upright members when not in use.

In some embodiments, the rugged indoor/outdoor television cart includes an accessory shelf that is formed to sit at or above the top edge of the television. The accessory shelf, in some embodiments, is designed to hold a camera or a combination camera/speaker bar.

In some embodiments, a rugged indoor/outdoor television cart includes a base frame and four legs radially extending from the frame, each of the four legs being connected at a proximal end to the base frame and being connected at a distal end to a respective castor, each of the four legs extending upward from the castor toward the base frame at a positive angle relative to a flat surface, when the rugged indoor/outdoor television cart is placed on the flat surface. The rugged indoor/outdoor television cart also includes at least one vertical upright extending from the base frame to support a television in an elevated state above the base frame, and a bracket mounting system connected to the vertical upright, the bracket mounting system including a mounting plate and a side plate, the mounting plate having a set of apertures to enable connection between the bracket mounting system and a television, the bracket mounting system further including at least one television mounting and stabilizing bar that is connected to the bracket mounting system and configured to engage top and bottom edges of the television when the television is connected to the mounting plate.

In some embodiments, the at least one vertical upright includes two vertical uprights extending from the base frame, and the bracket mounting system includes two side plates and two television mounting and stabilizing bars. In some embodiments, each television mounting and stabilizing bar has a top claw configured to engage a top edge of the television and a bottom edge configured to engage a bottom edge of the television. In some embodiments, the rugged indoor/outdoor television cart further includes padding material on an interior surface of each of the top claw and bottom claw to provide a firm and resilient engagement between the claws and the respective edges of the television. In some embodiments, each television mounting and stabilizing bar is formed from two pieces such that a distance between the top and bottom claws is adjustable to enable the television mounting and stabilizing bars to accommodate televisions with different vertical dimensions.

In some embodiments, the bracket mounting system is pivotably connected to the vertical upright to enable an angle of television screen to be adjusted relative to the vertical upright. In some embodiments, the bracket mounting system is pivotably connected to the vertical upright to enable an angle of television screen to be adjusted relative to the vertical upright about an axis of rotation that is horizontal.

In some embodiments, the rugged indoor/outdoor television cart further includes a battery power system, the battery power system having a removable rechargeable battery and a DC-AC power inverter to receive DC power from the removable rechargeable battery and create 120 volt AC power to be provided at an outlet to be supplied to a television, when the television is mounted to the rugged indoor/outdoor television cart. In some embodiments, the battery power system further includes a AC-DC power transformer configured to receive AC power, convert the AC power to DC power, and apply the DC power to the battery to provide charging power to the battery.

In some embodiments, the rugged indoor/outdoor television cart further includes a first handle connected to the base and a second handle connected to the vertical upright.

In some embodiments, each of the four legs extending upward from the castor toward the base frame at an angle of approximately between 20 and 45 degrees relative to a flat surface. In some embodiments, each of the four legs extending upward from the castor toward the base frame at an angle of approximately between 20 and 45 degrees relative to a flat surface. In some embodiments, each of the four legs extending upward from the castor toward the base frame at an angle of approximately 30 degrees relative to a flat surface, when rounding to the nearest two degrees.

In some embodiments, the rugged indoor/outdoor television cart further includes a sun shade connected to a top end of the at least one vertical upright, the sun shade having an extension positioned above a top edge of the television and a length to extend out in front of the television to at least partially shade the television from an overhead source of light.

In some embodiments, the rugged indoor/outdoor television cart further includes a shelf connected to a top end of the at least one vertical upright and positioned to be at an elevation higher than a top edge of the television.

BRIEF DESCRIPTION OF THE DRAWINGS

FIGS. 15 and 16 are side views of example adjustable television mounting and stabilizing bars, in which FIG. 15 shows the adjustable television mounting and stabilizing bars before being adjusted to engage and support a television, and FIG. 16 shows the adjustable television mounting and stabilizing bars after being adjusted to engage and support a television, according to some embodiments.

DETAILED DESCRIPTION

This disclosure is based, at least in part, on the realization that it would be desirable to provide a rugged indoor/outdoor television cart 100 designed to be able to support and power a television 105. The rugged indoor/outdoor television cart 100 is designed to be moved within a training facility as well as to be moved out onto an athletic field.

In some embodiments, a rugged indoor/outdoor television cart has four large castors supported on legs that extend upward from the castors and radially inward toward a base. Two vertical uprights are connected to the base. A bracket mounting system connects a television to the vertical uprights and enables an angle of television screen to be adjusted relative to the vertical uprights. Television mounting and stabilizing bars are provided that are connected to the bracket mounting system and have top and bottom claws which engage top and bottom edges of the television. The television mounting and stabilizing bars support the weight of the television and reduce stress from being transferred to the VESA mounting connection points on the interior of the television as the television cart is moved over uneven surfaces. A battery power system is optionally provided to provide power to the television when the television cart is not connected to an external source of power.

Figure 5:
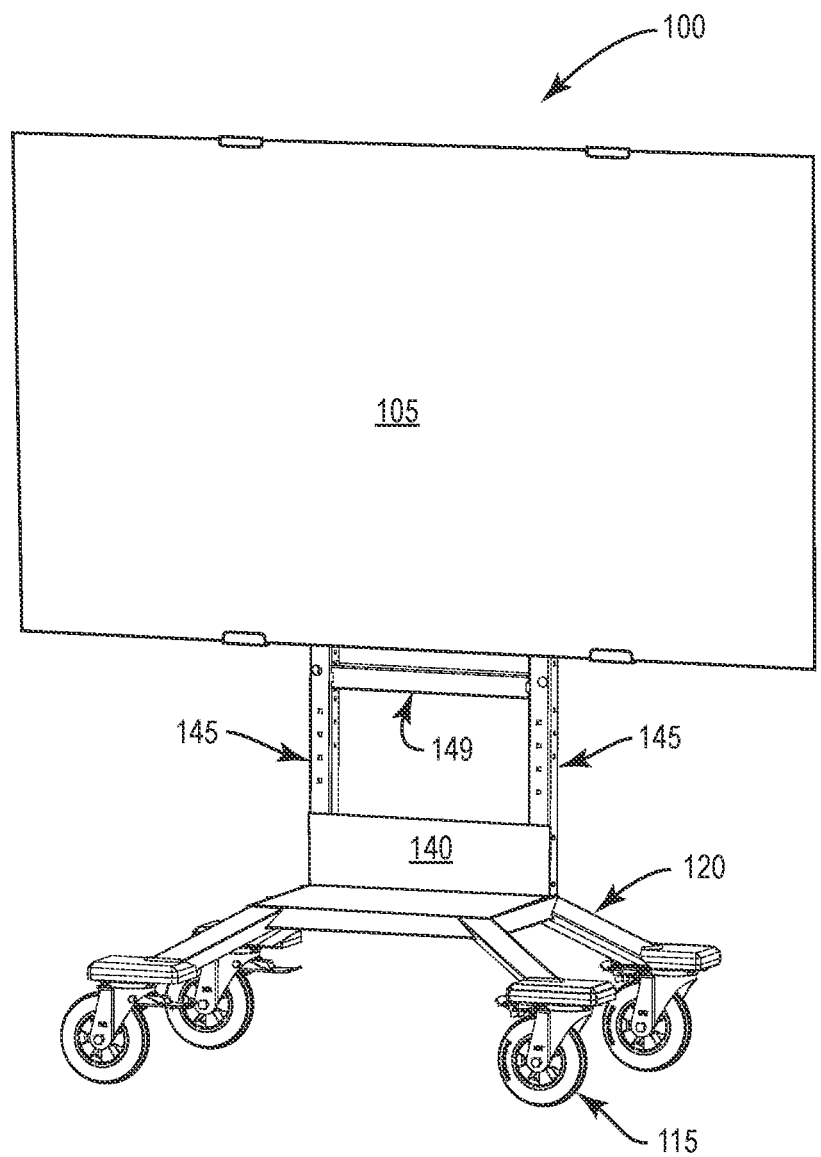
FIG. 5 is a front perspective view of an example rugged indoor/outdoor television cart without a battery power system, according to some embodiments.
Figure 6:
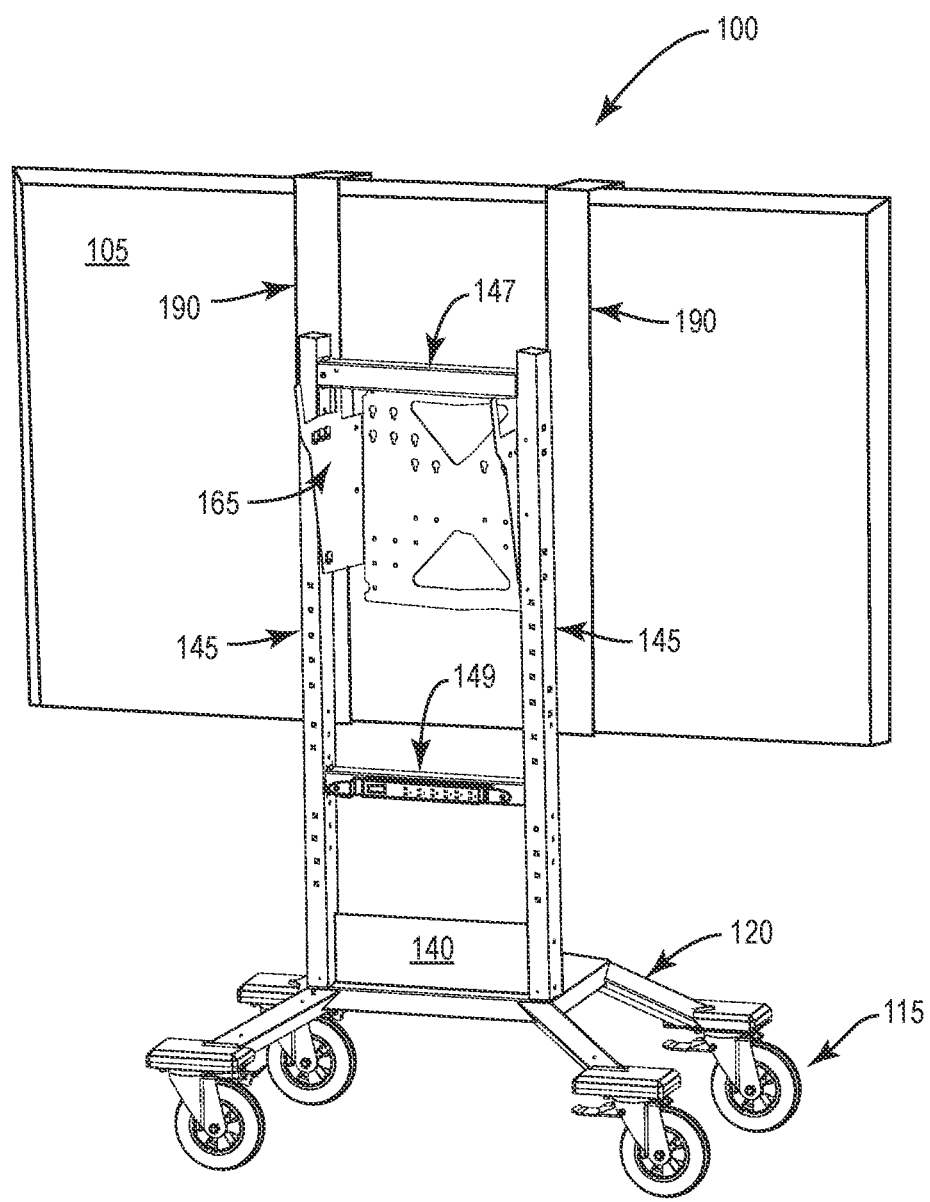
FIG. 6 is a rear perspective view of an example rugged indoor/outdoor television cart without a battery power system, according to some embodiments.
Figure 7:
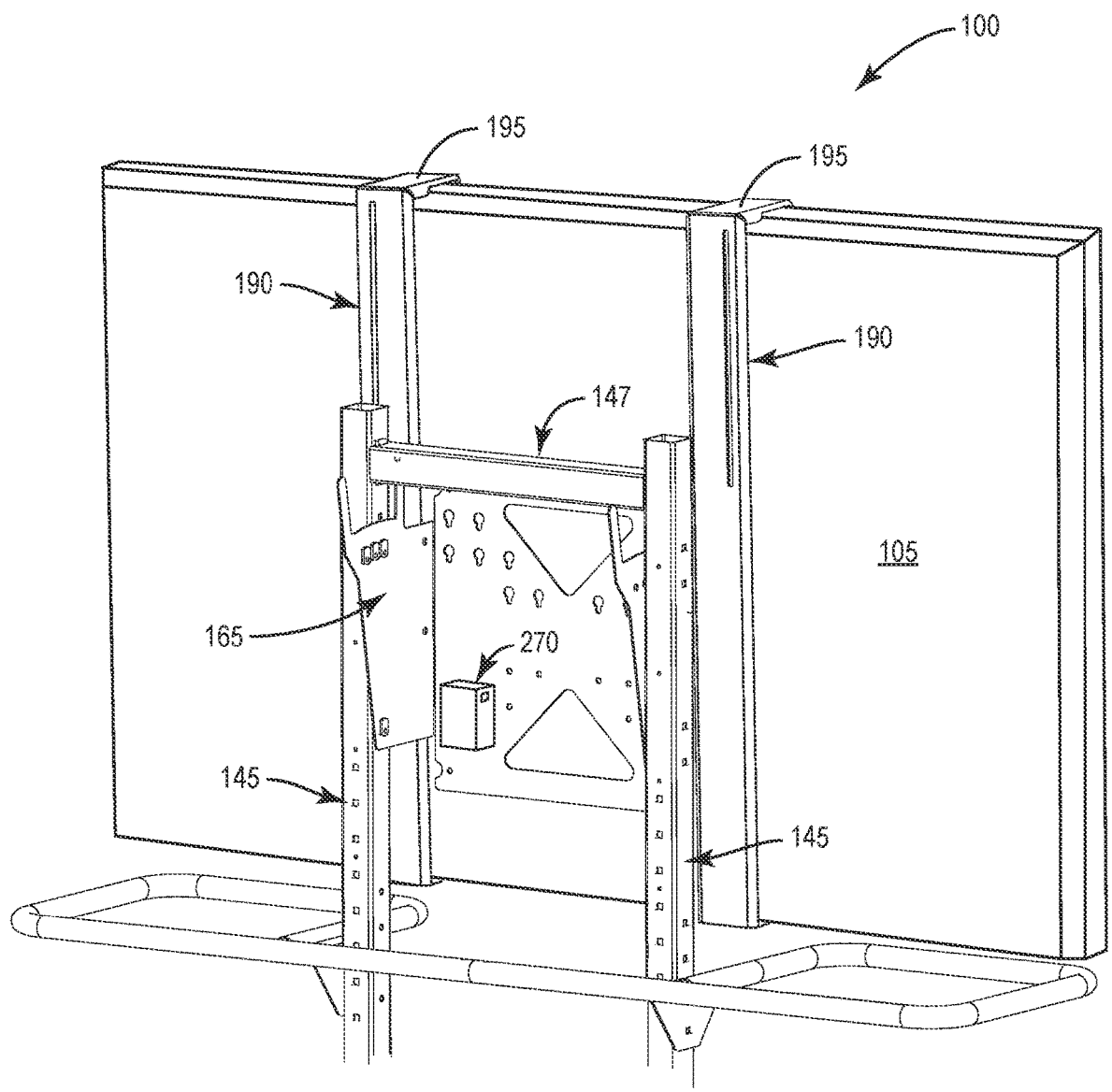
FIG. 7 is a rear perspective view of an example rugged indoor/outdoor television cart showing an example bracket mounting system and example television mounting and stabilizing bars in greater detail, according to some embodiments.

In some embodiments, for example as shown in FIGS. 1-4 and 12, the rugged indoor/outdoor television cart 100 includes an enclosure 110 designed to house a battery power system. The enclosure 110, in some embodiments, is designed to be water resistant to minimize the amount of exposure that the enclosed battery power system has to the environment. In some embodiments, for example as shown in FIGS. 5-6 the rugged indoor/outdoor television cart 100 does not include a battery power system and, accordingly, does not include enclosure 110. Alternatively, the rugged indoor/outdoor television cart 100 might include an enclosure 110 that does not contain a battery power system, in which case the enclosure might be used to store other items, such as a remote control for the television, a sound system, or other items that might be advantageously used in connection with the television 105.

As shown for example in FIGS. 1-6, 9, and 12, in some embodiments the rugged indoor/outdoor television cart includes large casters 115 that facilitate movement of the cart over uneven terrain. For example, in some embodiments the casters are formed using heavy duty wheels designed to make it easy to roll the rugged indoor/outdoor television cart 100 over uneven surfaces, such as artificial turf, grass, chipped or broken sidewalks, transoms, off curbs, dirt paths, grass, etc. Example wheels might be implemented using 8-inch heavy duty casters, although wheels of other diameters, such as 10-inch casters, could also be used depending on the implementation. In some embodiments, two of the casters are directional wheels that are fixed relative to legs 120, and two of the casters 115 are swivel wheels. For example, the wheels on the legs that extend toward the left of the television 105 may be fixed and the wheels on the legs that extend toward the right of the television may swivel. Alternatively, the wheels on the legs that extend toward the right of the television 105 may be fixed and the wheels on the legs that extend toward the left of the television may swivel. Still alternatively, in some embodiments all four casters may swivel, and optionally two or more of the castors may be directionally lockable. Advantageously, the use of large casters 115 smooths out bumps to thereby reduce the amount of stress imparted on the television as the rugged indoor/outdoor television cart encounters or is otherwise moved over uneven surfaces.

Figure 11:
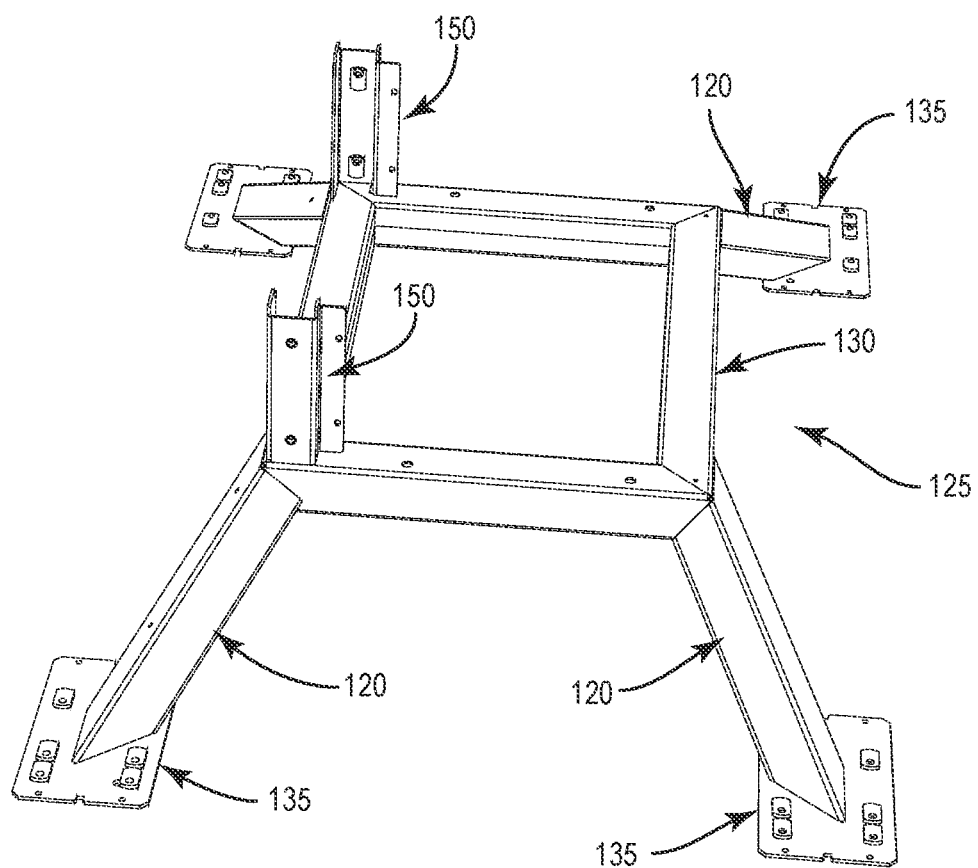
FIG. 11 is a side perspective view of an example base of an example rugged indoor/outdoor television cart showing a base frame, and four legs having connectors configured to attach to casters, according to some embodiments.

In some embodiments, the rugged indoor/outdoor television cart has a base with four radially extending legs 120. An example base is shown, for example, in FIG. 11. As shown in FIG. 11, in some embodiments, the base 125 includes a rectangular base frame 130 connected to each of the radially extending legs 120 at a respective corner. The frame may be formed, for example from 2" 14 gauge square tubing, having approximately 5/16 inch wall thickness, that has been laser cut and welded to create a professional grade, heavy duty cart base. Other gauge tubing or differently configured members may be used to implement the frame, depending on the implementation.

Each leg is connected at a proximal end to the frame 130, for example by being welded to the frame 130. Each leg has a caster plate 135 on a distal end to which the casters 115 are connected. In some embodiments, the caster plates 135 are welded to the legs on the distal ends of the legs 120. For example, the caster plate 135 in some embodiments has threaded apertures configured to enable the castors 115 to be connected to the castor plates using threaded bolts. In some embodiments, padding (shown for example in FIGS. 1-6, 9, and 12) is provided around the edges of the caster plate 135 to help protect against injuries and to protect surfaces such as walls and door frames when the rugged indoor/outdoor television cart is being moved.

As shown in FIGS. 1-6, 9, and 11, in some embodiments each leg extends upward at an angle from the distal end at the connection point to the castor plate 135 to the proximal end at the connection point to the frame, to provide additional ground clearance between the lower side of the rectangular frame 130 of the rugged indoor/outdoor television cart 100 and the ground. Having the legs 120 extend upward at an angle toward the junction with the frame 130 elevates the frame 130 relative to the ground, which facilitates movement of the rugged indoor/outdoor television cart over tall obstacles such as curbs.

In some embodiments, the rugged indoor/outdoor television cart 100 has two vertical uprights 145 that are connected to the frame 130. For example, as shown in FIG. 11, in some embodiments stubs 150 are welded to the frame 130, and uprights 145 are attached to the stubs 150 using mechanical fasteners such as threaded bolts. In other embodiments, the uprights 145 might be permanently attached to the frame 130 such as by being welded to the frame. Using mechanical fasteners to attach the uprights 145 to the stubs 150 facilitates removal and replacement of the uprights 145, and also enables the rugged indoor/outdoor television cart 100 to be disassembled, for example to enable the components of the rugged indoor/outdoor television cart 100 to be packaged for shipment from the factory or if the rugged indoor/outdoor television cart 100 is required to be transported between venues. In some embodiments, the vertical uprights are on the order of between 5 and 6 feet long, such that the maximum height of the rugged indoor/outdoor television cart, with a television attached, is lower than a standard door height. Example door heights might be on the order of 78 or 80 inches, depending on the local building code. Although some embodiments are shown in which the rugged indoor/outdoor television cart has two vertical uprights, in other embodiments a different number of vertical uprights may be used depending on the implementation.

Figure 2:
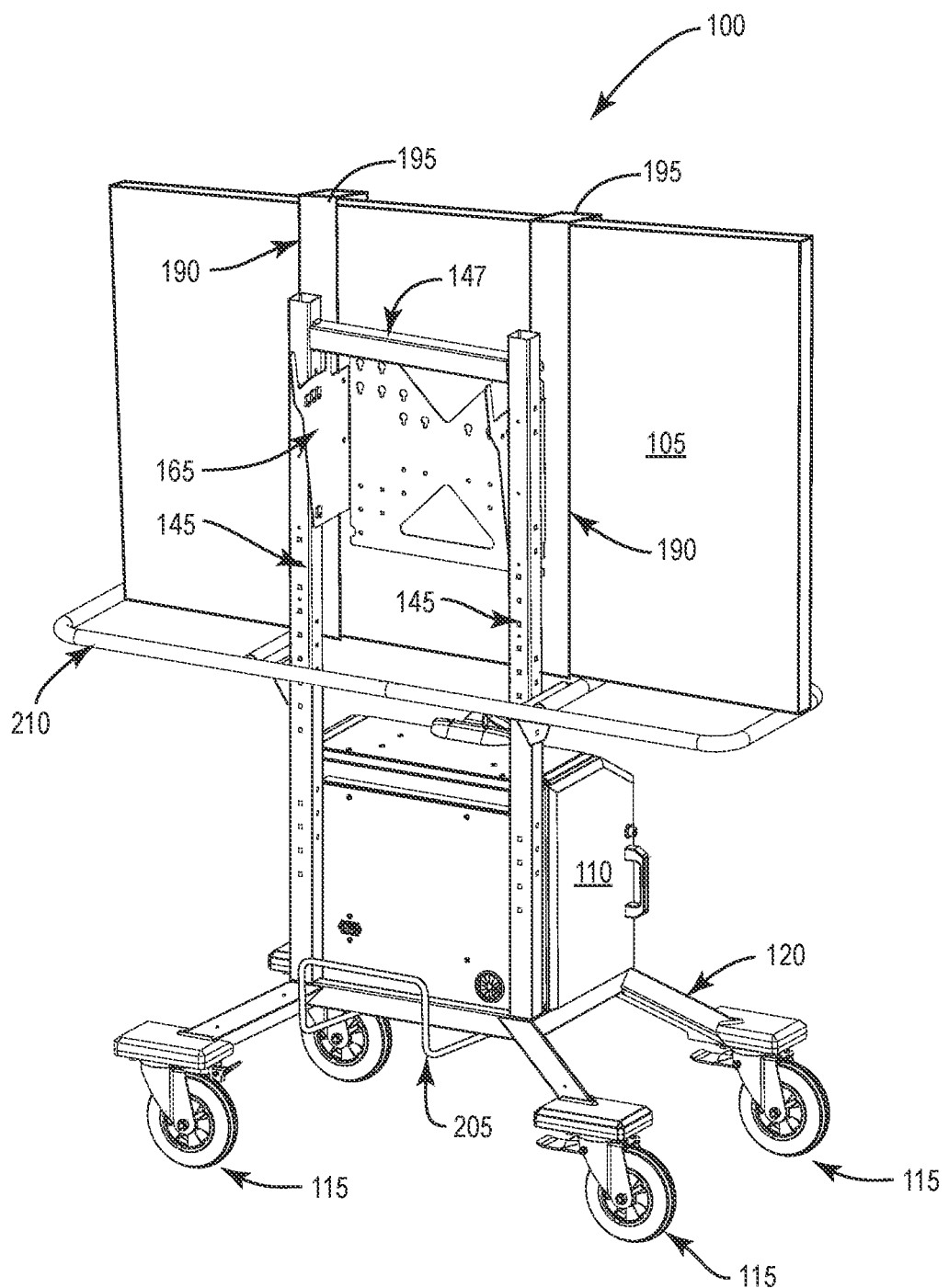
FIG. 2 is a rear perspective view of an example rugged indoor/outdoor television cart including a battery power system, according to some embodiments.
Figure 4:
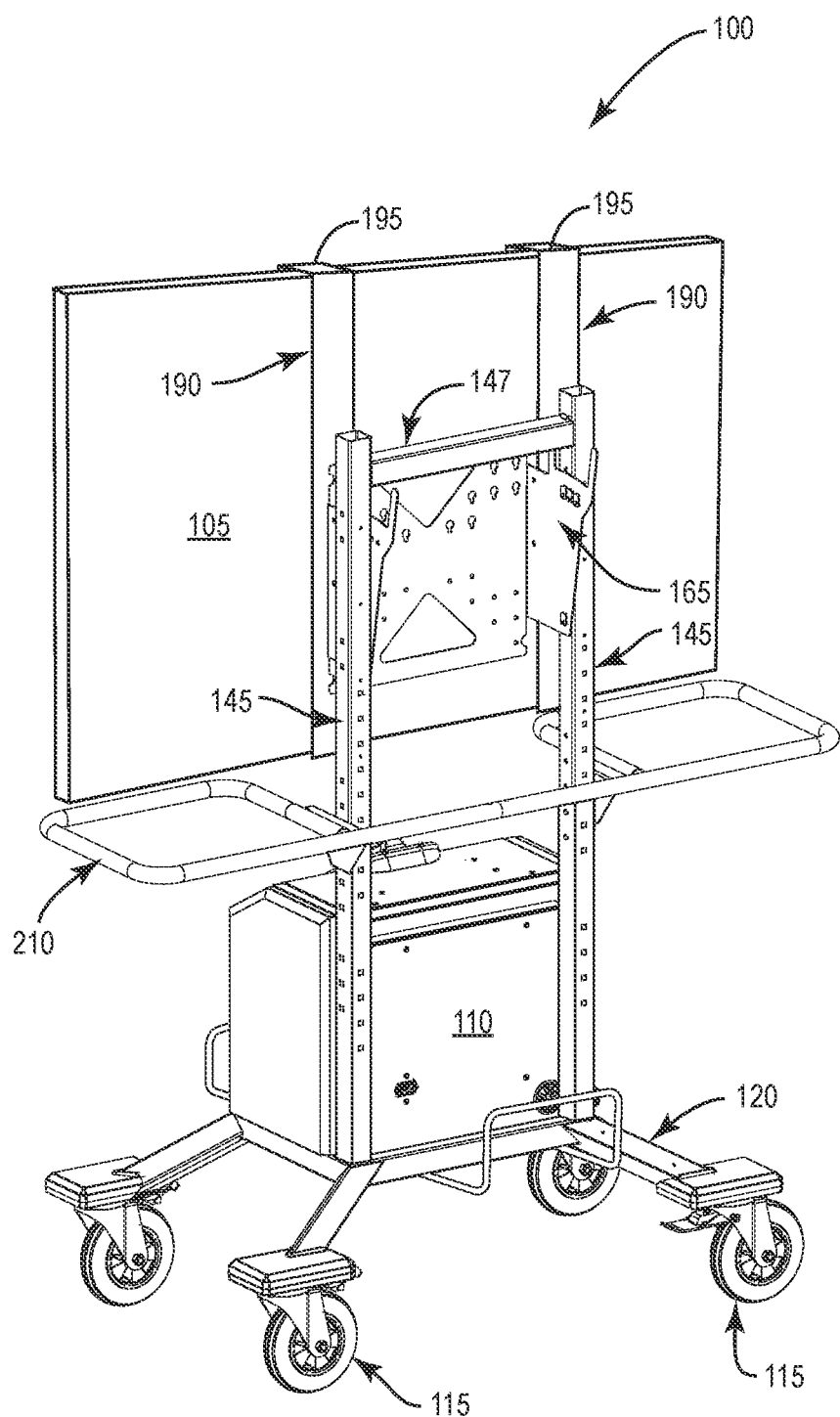
FIG. 4 is a rear perspective view of an example rugged indoor/outdoor television cart including a battery power system, according to some embodiments.

In some embodiments, for example as shown in FIGS. 2, 4, and 6, the vertical uprights are connected at a top end by a top horizontal crossbar 147. The top horizontal crossbar 147 may be welded to the uprights 145, or may be mechanically fastened to the uprights 145 depending on the implementation. In some embodiments, one or more additional horizontal crossbars 149 may also be included (see e.g. FIGS. 5-6), for example to provide additional rigidity to the rugged indoor/outdoor television cart 100.

Figure 19:
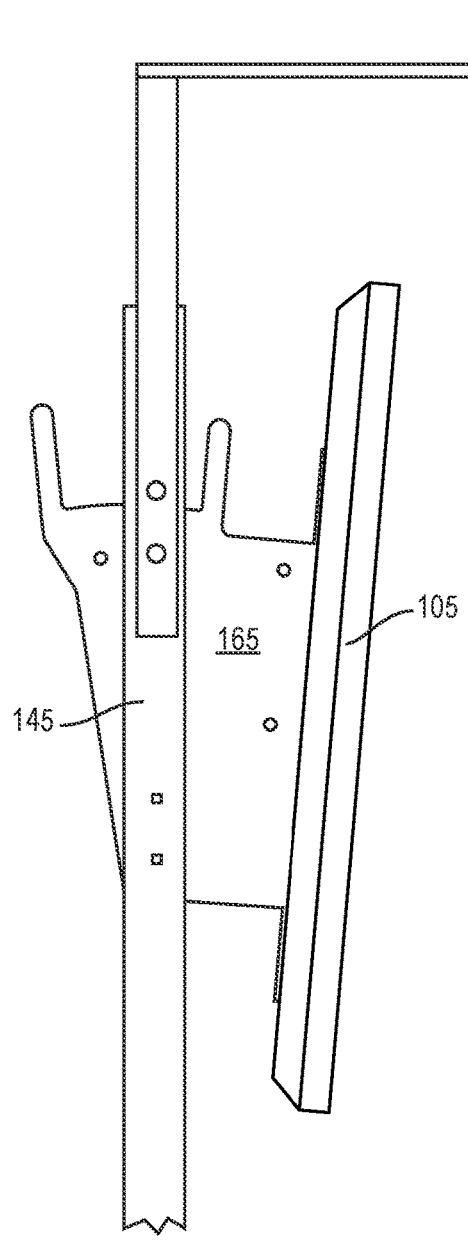
FIG. 19 is a side view of a top portion of an example rugged indoor/outdoor television cart, showing inclusion of a horizontal shade to extend the length of the television, over a top edge of a mounted television, and to horizontally extend in front of the front viewing surface of the television to shield the viewing surface of the television from overhead light(s) when the rugged indoor/outdoor television cart is used in a brightly lit environment.
Figure 20:
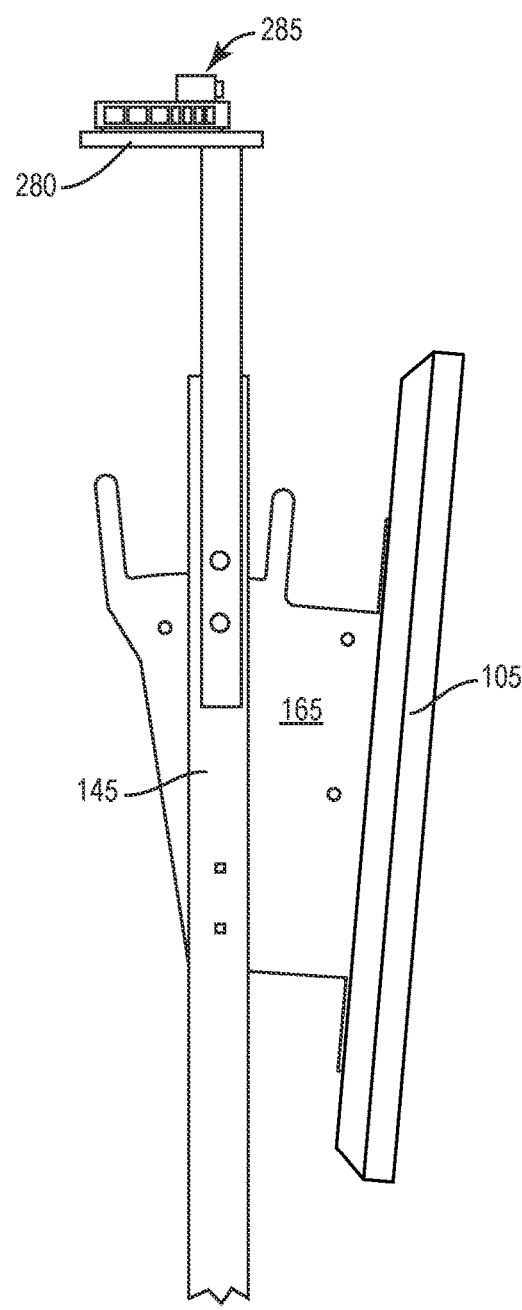
FIG. 20 is a side view of a top portion of an example rugged indoor/outdoor television cart, showing inclusion of an accessory shelf configured to hold an accessory such as a camera or combination camera/speaker bar in a position to be visible above the top edge of the television, according to some embodiments.

In some embodiments, as shown in FIGS. 19 and 20, one or more accessories is provided that may be attached to the vertical uprights, for example at a top of the vertical uprights.

FIG. 19 is a side view of a top portion of an example rugged indoor/outdoor television cart, showing inclusion of a horizontal sun shade that extends the length of the television, over a top edge of the television, and extends horizontally above the front viewing surface of the television to shield the viewing surface of the television from overhead light(s) when the rugged indoor/outdoor television cart is used in a brightly lit environment. In a brightly lit environment, the light from the sun or from overhead lights such as stadium flood lights may reflect off the screen of the television, thus making it difficult to see the content being shown on the television. By providing an overhead sun shade that extends out beyond the front surface of the television, it is possible to at least partially shield the television screen from these types of external light sources, to thereby at least partially reduce glare from overhead external light sources. In some embodiments, the horizontally extending portion of the shade is connected to the horizontal uprights using hinges, thus enabling the horizontal sun shade to be rotated back to be stored in a vertical orientation behind the television when not in use.

FIG. 20 is a side view of a top portion of an example rugged indoor/outdoor television cart, showing inclusion of an accessory shelf configured to hold an accessory such as a camera or combination camera/speaker bar in a position to be visible above the top edge of the television, according to some embodiments. As shown in FIG. 20, in some use-case scenarios it might be advantageous to be able to include an accessory shelf positioned approximately at the height of the top edge of the mounted television. The accessory shelf may be used to hold an accessory such as a video camera or a combination video/audio bar. In some embodiments, a shown in FIG. 20, an accessory shelf is mounted to the vertical uprights, for example by being bolted to the vertical uprights. The shelf may extend toward the television as shown in FIG. 20 or may extend away from the television, depending on the implementation. A selection of apertures may be included in the shelf, depending on the intended type of accessory to be carried by the shelf. Although some embodiments are shown in which the shelf is placed at the top of the vertical uprights, it should be understood that an accessory shelf may also be placed at other locations along the vertical uprights, such as below the television. Similarly, although the accessory shelf is shown in FIG. 20 as primarily flat, it should be understood that other types of accessory trays, baskets, or boxes may be connected to the vertical uprights as well, depending on the particular implementation.

Figure 10:
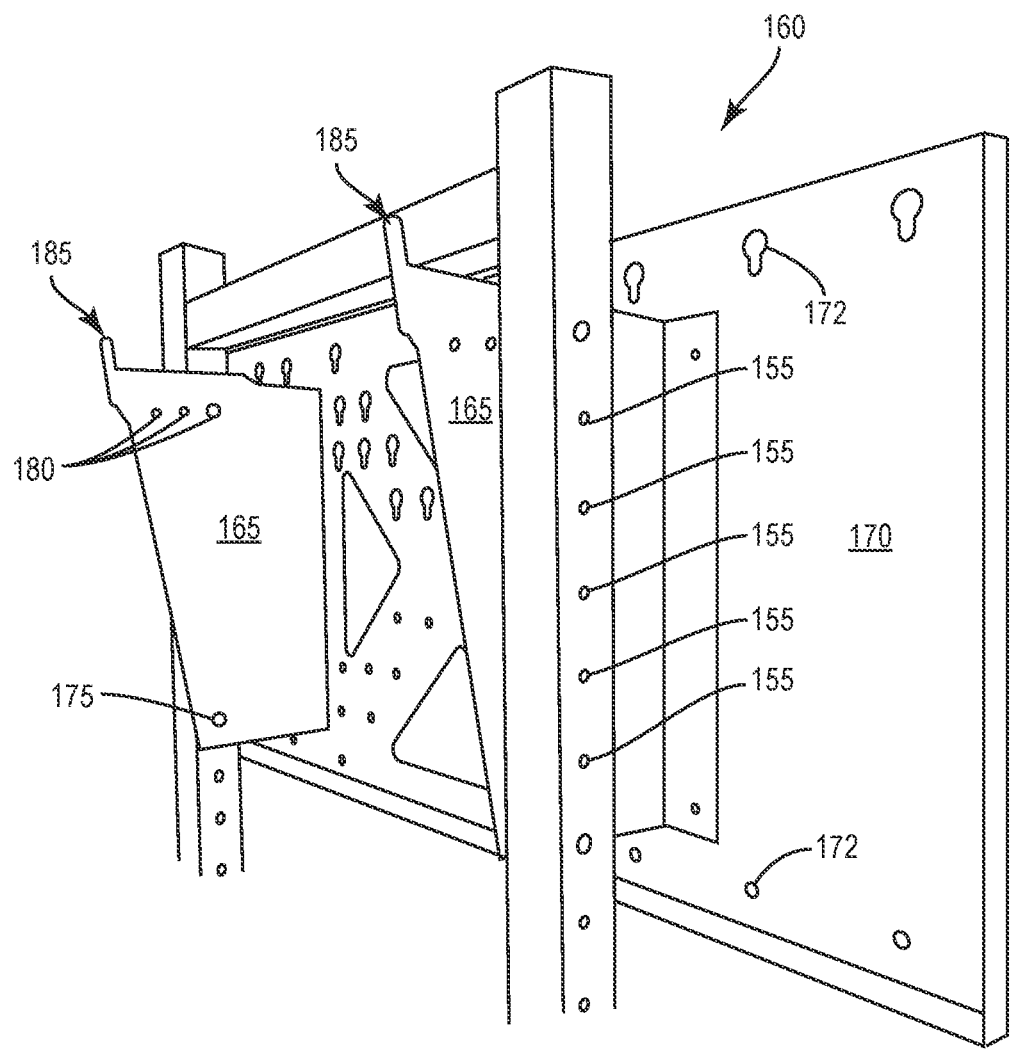
FIG. 10 is a rear perspective view of an upper section of an example rugged indoor/outdoor television cart showing the bracket mounting system and television mounting plate in greater detail, according to some embodiments.

In some embodiments, for example as shown in FIG. 10, the vertical uprights 145 are pre-drilled with apertures 155 formed along a substantial portion of their length. For example, apertures 155 might be formed at 2-inch or other intervals along substantially the entire length of the uprights to facilitate mounting of components on the vertical uprights 145 at different positions. For example, as shown in FIG. 10, a bracket mounting system 160 may be bolted to the vertical uprights using various sets of apertures to enable the bracket mounting system to be mounted to the vertical uprights at a number of different heights. Accordingly, if a larger television is to be mounted on the rugged indoor/outdoor television cart 100, the bracket mounting system may be mounted lower down on the vertical uprights 145. This enables the rugged indoor/outdoor television cart 100 to accommodate larger television sizes without causing the top edge of the television to exceed a typical door height. In some embodiments, the rugged indoor/outdoor television cart 100 is designed to support a television having a diagonal dimension of between 55 and 86 inches, although televisions of other sizes may also be accommodated depending on the implementation.

In some embodiments, the rugged indoor/outdoor television cart 100 has a bracket mounting system 160 configured to connect the television 105 to the vertical uprights 145. An example bracket mounting system is shown in FIG. 10, and is also shown in FIGS. 2, 4, 6, and 7. As shown for example in FIG. 10, in some embodiments the bracket mounting system 160 includes a pair of side plates 165 connected to a television mounting plate 170. An example television mounting plate is shown in greater detail in FIG. 8.

In some embodiments, as shown in FIG. 10, the side plates 165 are formed to have a lower aperture 175 disposed close to a bottom edge, and a plurality of upper apertures 180 closer to a top edge. The side plate is connected to the upright 145 using a mechanical fastener such as a bolt that extends through the lower aperture 175 disposed close to the bottom edge. This mechanical fastener serves as a pivot point that enables the side bracket 165 to rotate through a limited range of motion, for example up to 10 degrees. The plurality of upper apertures 180 closer to the top edge of the bracket 165, to enable a desired angle of the television mounting plate 170 to be set relative to the vertical uprights. Specifically, by rotating the side plates 165 relative to the uprights 145, the upper apertures 180 serially are presented to aperture 155 of vertical upright 145. When a desired angle is obtained, a mechanical fastener is inserted through a selected one of the upper apertures 180 and the corresponding aperture 155 of vertical upright 145 to secure the side plate 165 at a desired angle. Although some embodiments have been described in which the side plates include a plurality of apertures 180, it should be understood that an arcuate slot could be used instead of the plurality of apertures 180 depending on the implementation. Likewise, it should be understood that some embodiments might use a single upper aperture 180 and a plurality of lower apertures 175, or a single upper aperture 180 and an arcuate slot instead of the plurality of lower apertures 175. Similarly, some embodiments might be implemented using a plurality of upper apertures 180 and a plurality of lower apertures 175, or two arcuate slots, depending on the implementation.

In some embodiments, one or both of the side plates 165 includes a protrusion 185 along an upper edge to prevent over-rotation of the side plates 165 about the mechanical fastener extending through the lower aperture 175. Although some embodiments are described in which the pivot is on the lower side of the plate, in some embodiments the pivot is formed on the top of the side plates, and a plurality of apertures are formed on the lower side of the plate.

By providing a bracket mounting system that enables the angle of the television to be adjusted from a vertical position to a partially downward facing angle, it is possible to cause the front of the television to be angled downward by up to approximately 10-15 degrees relative to the vertical uprights 145. Enabling the television to be angled downward can be useful, in particular circumstances, for example to reduce an amount of glare or reflection resulting from use of the television in a bright environment, such as in bright sunlight or from stadium floodlights. Optionally, as discussed in connection with FIG. 19, a sun shade may also be attached to extend out over the top of the television to reduce the amount of light that directly shines on the television screen to further reduce glare.

Figure 8:
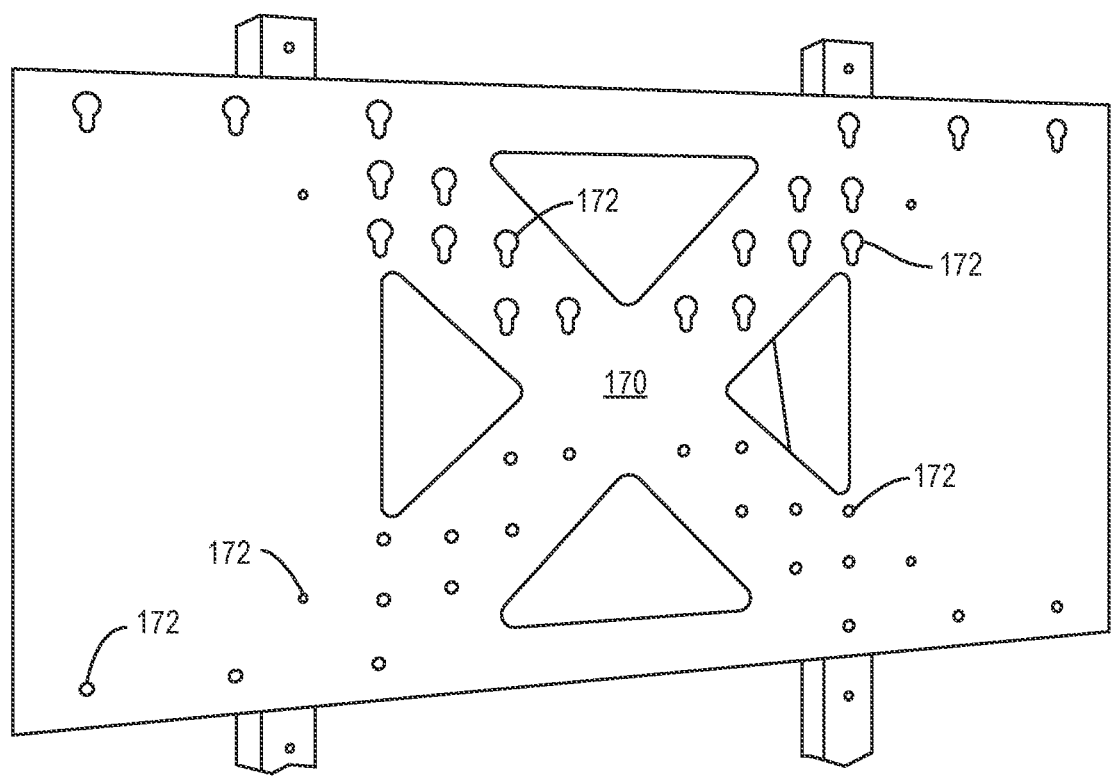
FIG. 8 is a front perspective view of an example television mounting plate configured to engage television mounting systems formed on the rear surface of televisions of various sizes, according to some embodiments.

As shown in FIG. 10, in some embodiments the side plates 165 are connected to a television mounting plate 170. FIG. 8 is a front view of an example television mounting plate. As shown in FIG. 8, in some embodiments the television mounting plate 170 has a plurality of apertures patterned based on one or more of the VESA standards. VESA standards are divided into VESA classifications, which are referred to as Mounting Interface Standards (MIS). Different televisions 105 may have different VESA mounting holes/hole patterns. For example, the VESA MIS-F standard, which is often used in connection with larger sized televisions, specifies hole patterns (horizontal distance in mm×vertical distance in mm) that includes 400×200, 400×400, 600×200, 600×400, and 800×400 hole patterns. By including a plurality of different apertures in the television mounting plate 170, it is possible to accommodate a large number of televisions without requiring customization of the television mounting plate 170. It should be noted that customization of the television mounting plate 170 is possible, depending on the implementation, by drilling additional holes in the mounting plate to accommodate a particular television, for example if the television has mounting attachments at non-standard mounting locations.

As shown in FIG. 8, in some embodiments some of the apertures 172 in the television mounting plate 170 are formed as key-hole apertures. Key-hole apertures enable a bolt to be connected to a respective threaded receiver on the back of the television, the head of the bolt is then passed through the top (larger part) of the key-hole aperture, and then the television is lowered causing the shaft of the bolt to enter the lower (thin part) of the key-hole aperture. Although FIG. 8 shows a top subset of the apertures 172 implemented as key-hole apertures, it should be understood that all of the apertures 172 may be implemented as key-hole apertures depending on the implementation.

In some embodiments, the television mounting plate 170 has large cut-out areas to provide access to electrical connectors that might be disposed on the back of the television 105, thus facilitating connection of power cords, HDMI cables, and other electrical power or data connections to the television once the television is bolted to the television mounting plate.

In some embodiments, television mounting and stabilizing bars 190 are provided to support the television and provide an additional way of securing the television to the rugged indoor/outdoor television cart. A rugged indoor/outdoor television cart 100 that includes television mounting and stabilizing bars 190 is shown, for example, in FIGS. 1-6. For example, as shown in FIG. 2, in some embodiments the television mounting and stabilizing bars 190 are configured to connect to the side plates 165 and extend from the top edge of the television 105 to the bottom edge of the television 105. Claws 195 on the top and bottom of the television mounting and stabilizing bars 190 extend the depth of the television and protrude somewhat in front of the front screen of the television 105. Appropriate padding 197 may be added to the interface between the top and bottom claws 195 and the television 105, to prevent the television from being damaged by the television mounting and stabilizing bars 190. Claws 195 of stabilizing bars 190 are shown extending around the top and bottom edges of the television 105, for example, in FIGS. 1 and 3.

The television mounting and stabilizing bars 190 engage the top and bottom edges of the television 105 to provide a secure and rigid attachment between the television 105 and the bracket mounting system. By providing television mounting and stabilizing bars, the movement of the television relative to the uprights 145 is minimized, particularly when the rugged indoor/outdoor television cart is moved over uneven surfaces such as rough sidewalks or grass. By using television mounting and stabilizing bars to reduce movement of the television relative to the uprights 145 of the rugged indoor/outdoor television cart, it is possible to help maintain the integrity of the interior television mounting system (VESA connections inside the TV), because at least a portion of the stress that would normally be borne entirely on the internal VESA connections is transferred to the stabilizing bars. The television mounting and stabilizing bars also are useful in a windy environment, to help absorb some of the torque load that wind can impart on the television.

Figure 15:
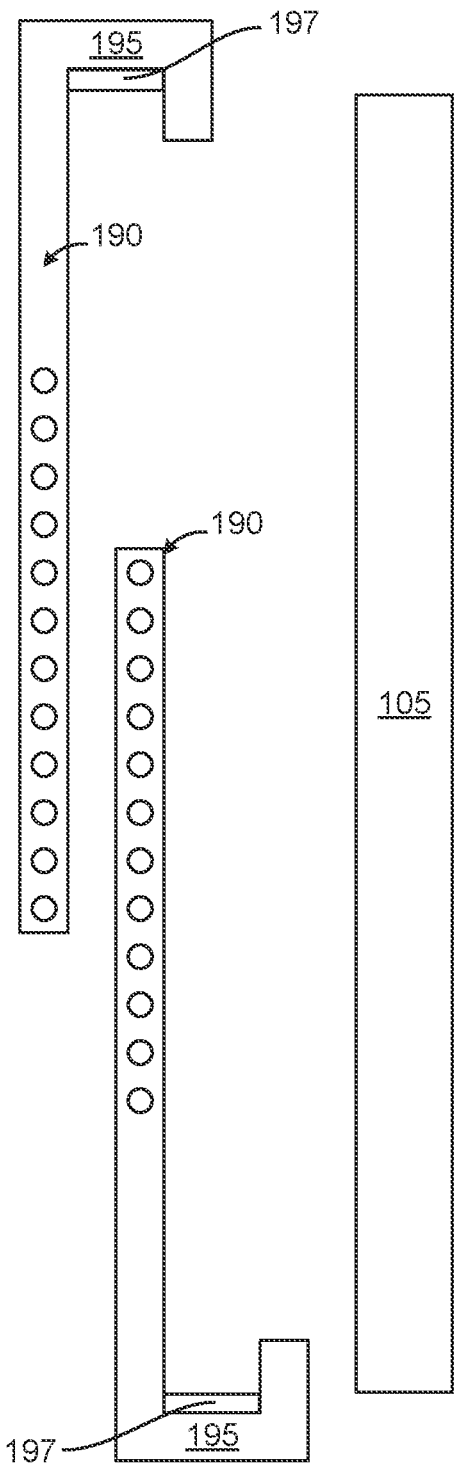
Figure 16:
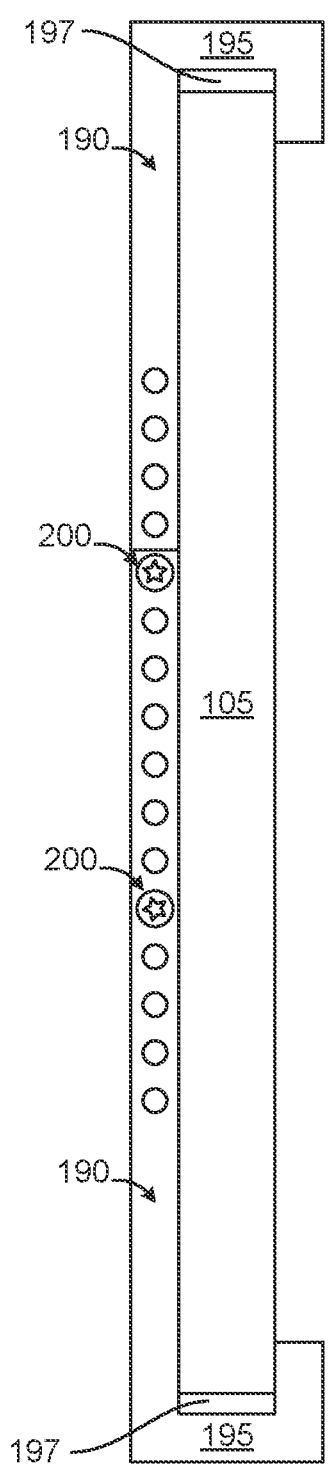

FIGS. 15 and 16 are side views of example adjustable television mounting and stabilizing bars, in which FIG. 15 shows the adjustable television mounting and stabilizing bars before being adjusted to engage and support a television, and FIG. 16 shows the adjustable television mounting and stabilizing bars after being adjusted to engage and support a television, according to some embodiments. It should be understood that the example shown in FIGS. 15 and 16 is intended to show the manner in which a pair of similarly constructed adjustable television mounting and stabilizing bars 190 may be fitted to a television. The particular implementation might use other adjustment mechanisms, such as using clamps or other devices to secure the adjustable television mounting and stabilizing bars relative to each other once they have been adjusted to fit a particular television.

As shown in FIG. 15, in some embodiments the adjustable television mounting and stabilizing bars 190 have claws 195 designed to fit around an edge of a television 105 to engage a portion of a front surface of the television. Optionally, as shown in FIGS. 15-16, and 17-18, padding 197 may be included in claw 195 to provide a resilient but soft engagement between the claw 195 and the edge of the television 105.

Figure 17:
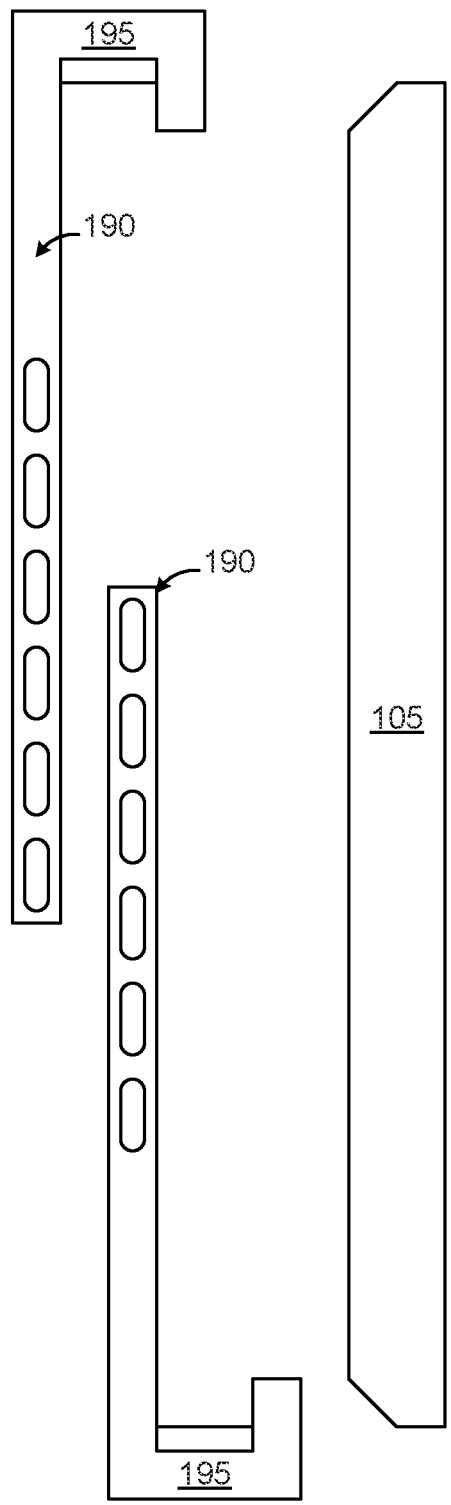
FIGS. 17 and 18 are side views of example adjustable television mounting and stabilizing bars similar to FIGS. 15 and 16, in which slots are provided rather than apertures to enable the adjustable television mounting and stabilizing bars to accommodate a more varied range of television dimensions, according to some embodiments.
Figure 18:
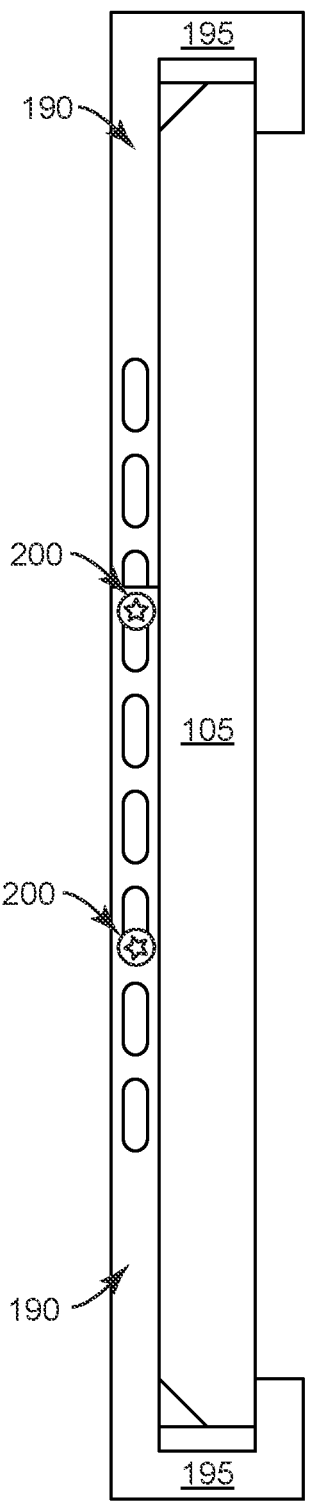

In the embodiment shown in FIG. 15, each adjustable television mounting and stabilizing bar 190 includes a plurality of apertures designed to enable the pair of adjustable television mounting and stabilizing bars 190 to be secured relative to each other at a plurality of locations, thus allowing for adjustment of the adjustable television mounting and stabilizing bars 190 to accommodate a range of television sizes. For example, in FIG. 15, the adjustable television mounting and stabilizing bars are not yet assembled to the television 105, whereas in FIG. 16 the adjustable television mounting and stabilizing bars 190 have been assembled to the television and secured to each other using bolts 200. Although FIGS. 15 and 16 show some embodiments in which apertures are used to connect the stabling bars 190, it should be understood that the openings in the bars 190 could have other shapes, such as elongated slots as shown in FIGS. 17 and 18, that would enable continuous adjustability of the stabilizing bars relative to each other to ensure a snug fit between top and bottom claws 195 and the edges of the television 105. Using elongated slots enables the television mounting and stabilizing bars to accommodate a broad range of television dimensions.

In some embodiments, one or more handles are provided to help move the cart. For example, as shown in FIGS. 1-6, in some embodiments the rugged indoor/outdoor television cart 100 includes a base level handle 205 to facilitate lifting the rugged indoor/outdoor television cart 100. For example, if it is necessary to lift the cart to help move the cart over a curb or other obstacle, having a base level handle 205 might enable a user to provide assistance to help navigate the rugged indoor/outdoor television cart 100 through these types of obstacles.

In some embodiments, the base level handle is also shaped and sized to enable the base level handle to support an additional battery. Optionally, one or more straps may be provided on the base level handle to secure the spare battery to the cart, for example in connection with transportation of the cart. Providing a spare battery on the lower handle may also help lower the center of gravity, thus reducing the likelihood that the cart will tip over.

In some embodiments the rugged indoor/outdoor television cart 100 includes a waist level handle 210 that may be connected, for example using mechanical fasteners, to the vertical uprights 145. In some embodiments, as shown for example in FIG. 1, the waist level handle 210 is designed to extend out beyond the front of the television and to extend beyond a back surface of the television, to protect the television as well as to provide a secure place to grip the rugged indoor/outdoor television cart 100 when moving the rugged indoor/outdoor television cart 100.

In some embodiments, the rugged indoor/outdoor television cart 100 includes a battery power system to power the television so that the rugged indoor/outdoor television cart 100 is not required to be continuously connected to an external source of power while in use. For example, as shown in FIGS. 1-4 and 12, in some embodiments the rugged indoor/outdoor television cart 100 includes an enclosure 110 designed to house a battery power system.

The enclosure 110, in FIGS. 1-4 and 12, has a battery access port 215 configured to receive a battery. The battery of the battery power system may be implemented, for example, using a rechargeable 1000-watt-hour lithium-ion battery, although batteries of different sizes may be used depending on the implementation. The battery may be implemented using a water-tight enclosure to prevent moisture, for example from rain, from affecting the battery. In some embodiments, as shown in FIG. 13, the battery is formed to have a profile, and an outer opening of the battery access port 215 is formed to have a similar profile that will enable the battery to be placed into the battery access port in only one orientation.

In some embodiments, electrical connectors are formed on a bottom surface of the battery and corresponding connectors are formed on the bottom of the battery access port, to thus enable electrical connection between the battery and the rugged indoor/outdoor television cart 100 to occur automatically when the battery 220 is placed into the battery access port 215. In some embodiments, the battery 220 has a handle 225 formed on a top surface to enable the battery to be controlled while being inserted into the battery access port 215 and to facilitate removal of the battery from the battery access port 215.

Figure 1:
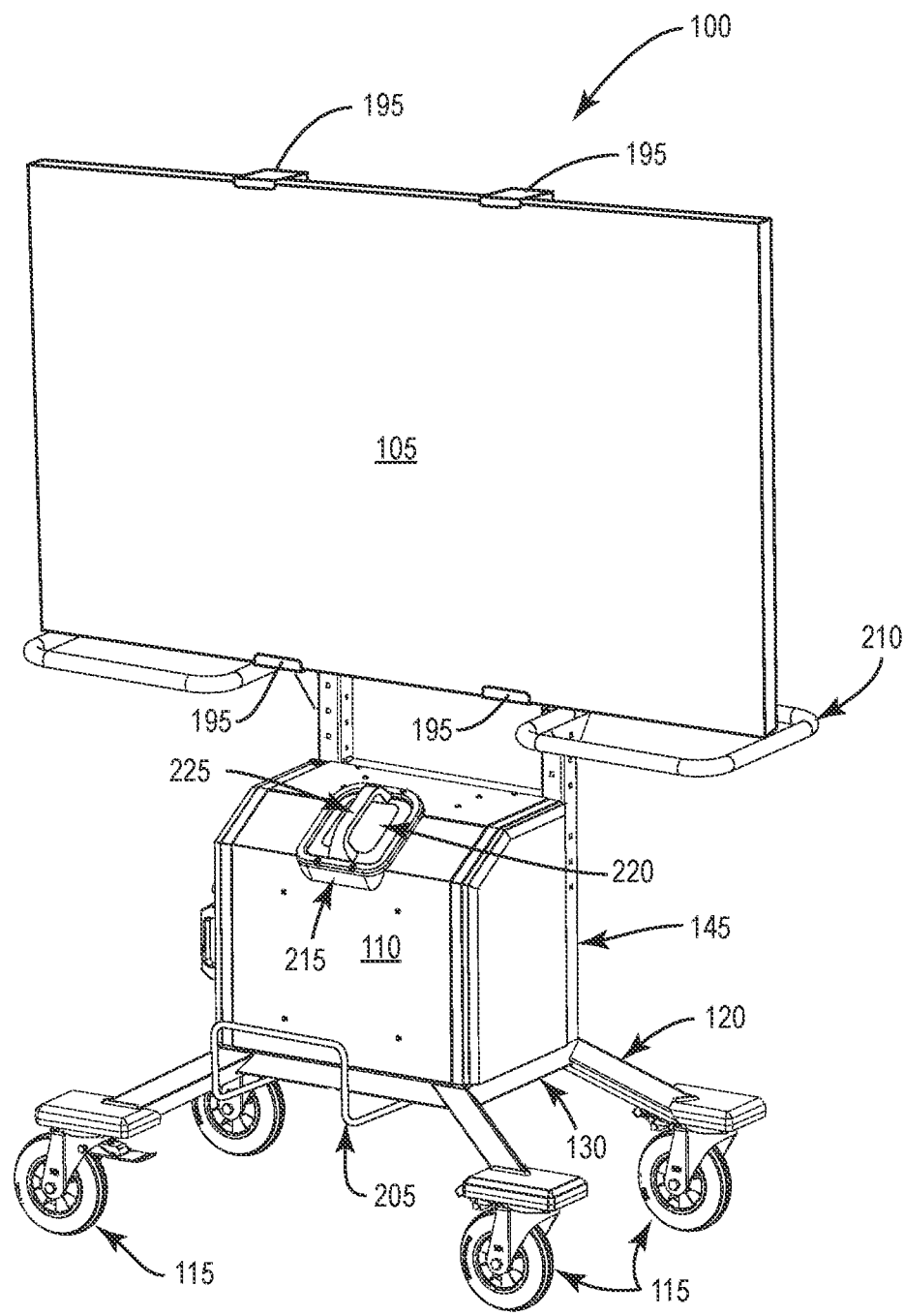
FIG. 1 is a front perspective view of an example rugged indoor/outdoor television cart including a battery power system, according to some embodiments.
Figure 3:
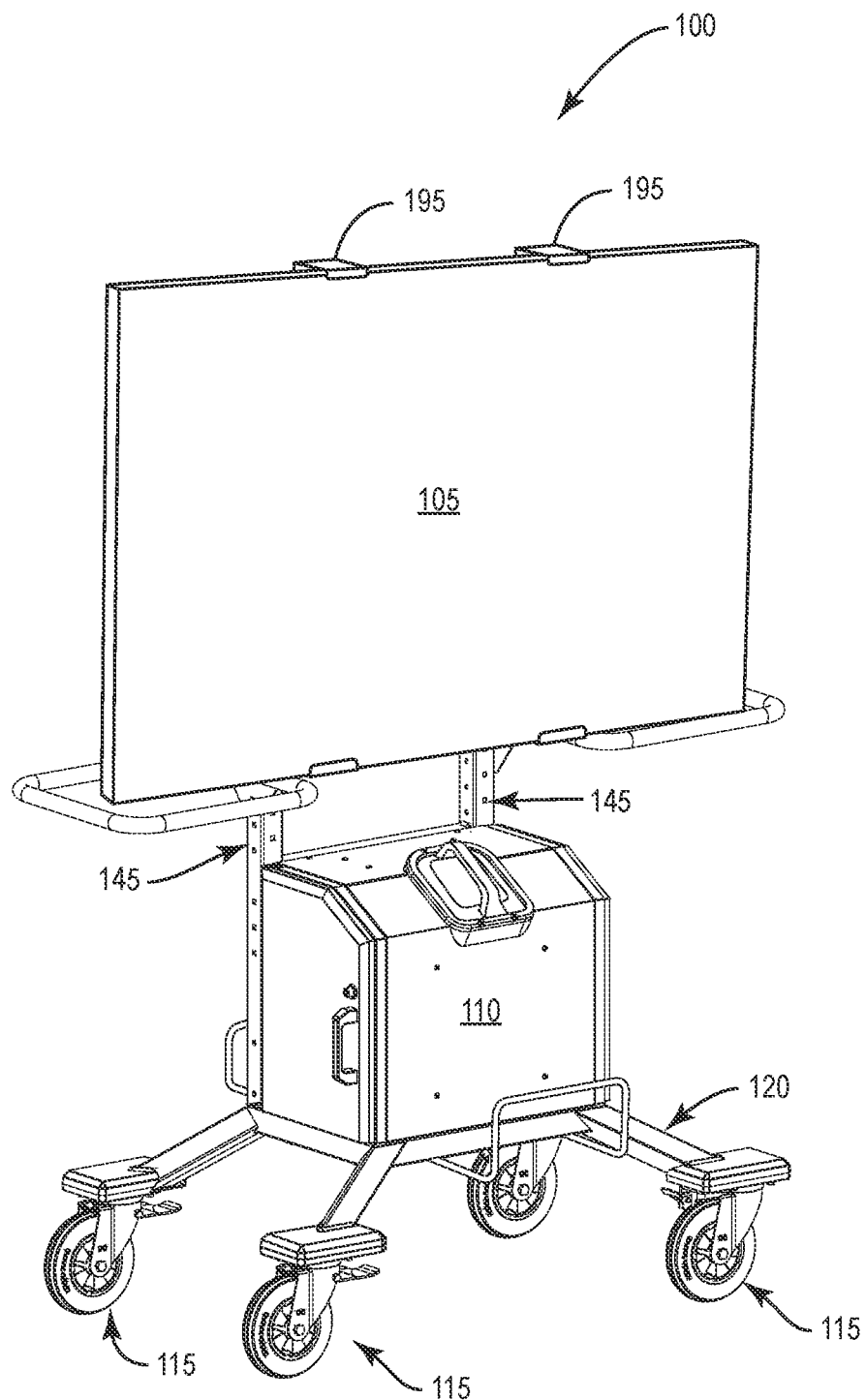
FIG. 3 is a front perspective view of an example rugged indoor/outdoor television cart including a battery power system, according to some embodiments.
Figure 12:
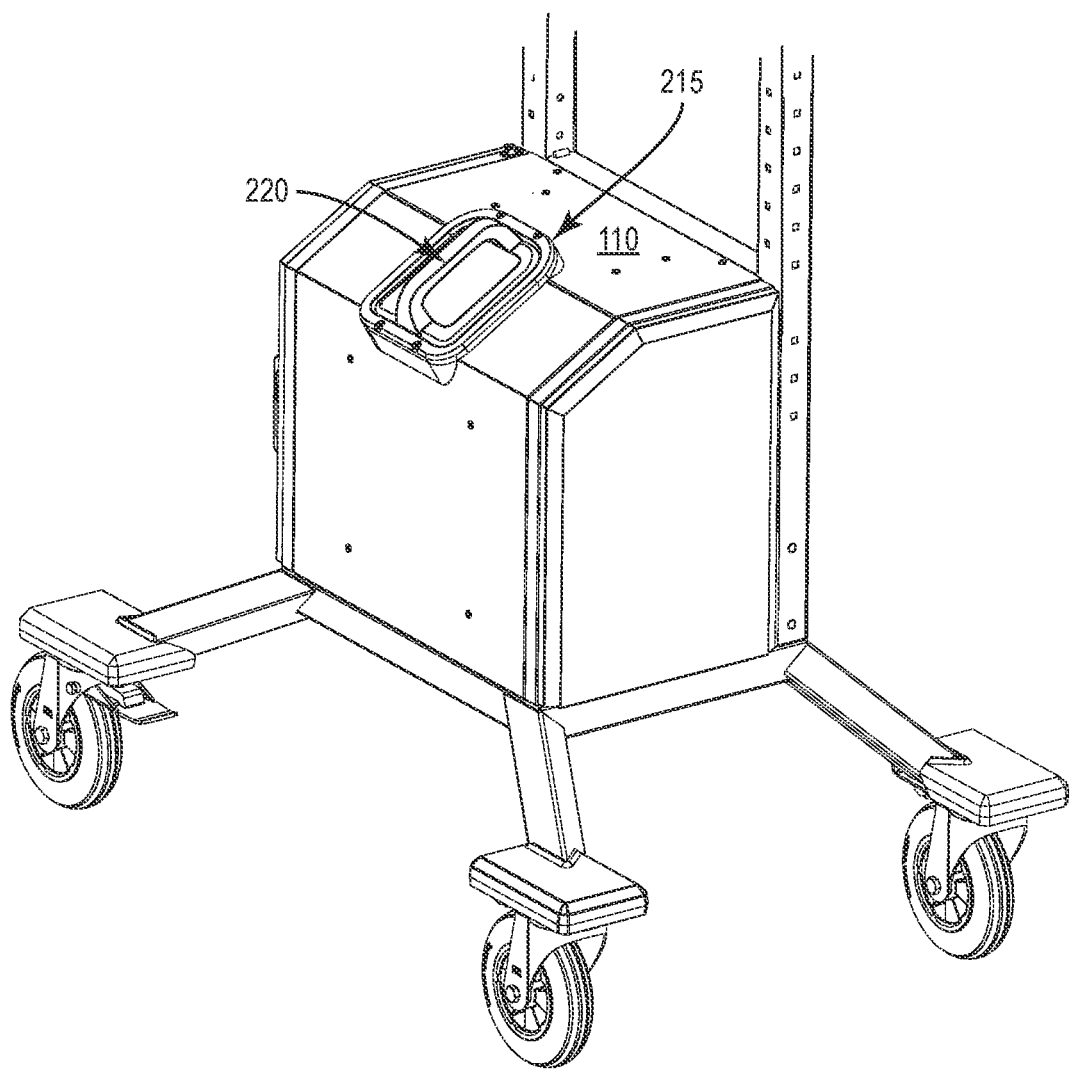
FIG. 12 is a side perspective view of an example base of an example rugged indoor/outdoor television cart showing the base with four legs connected to casters, and an example enclosure designed to house a battery power system, according to some embodiments.
Figure 13:
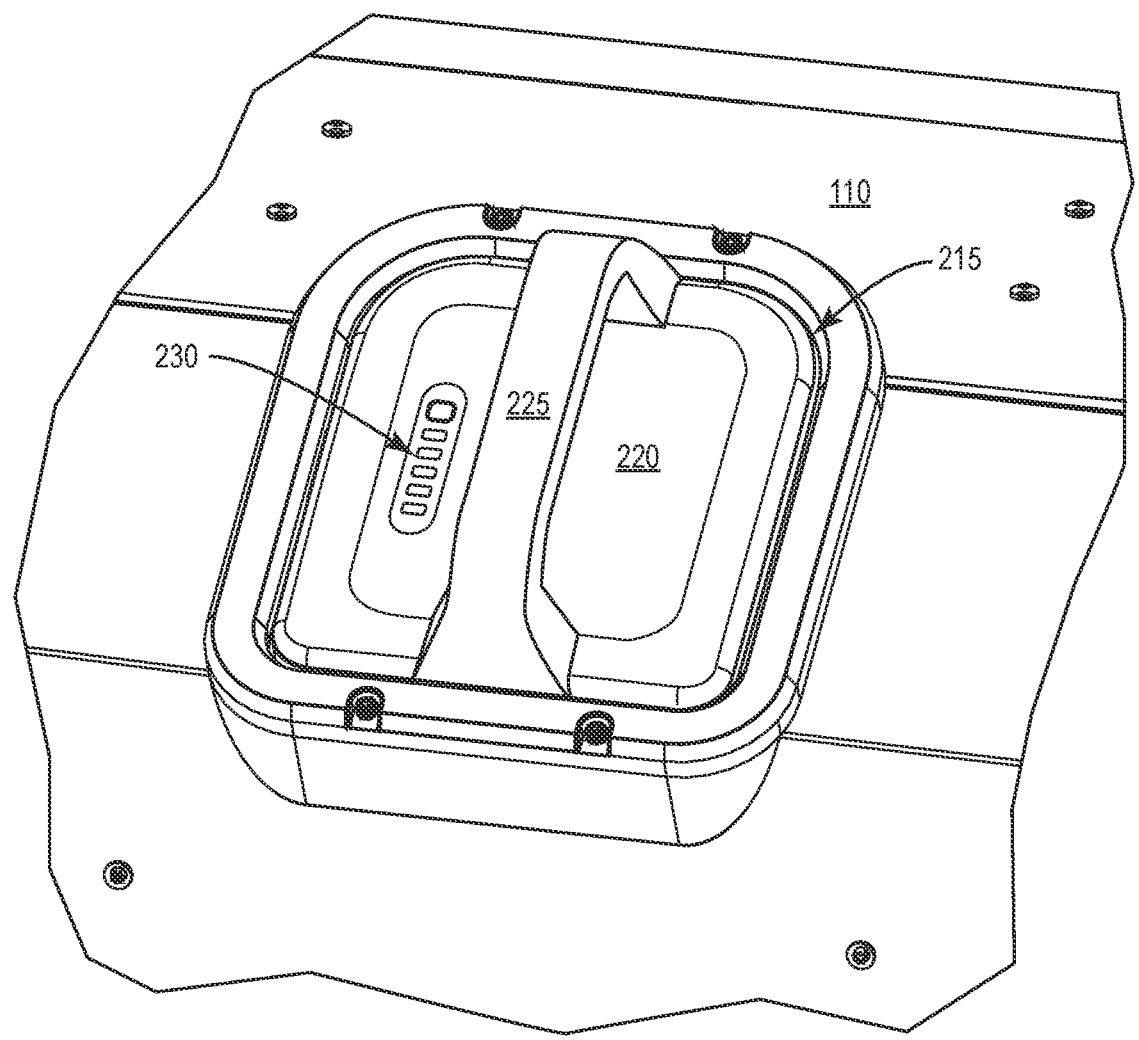
FIG. 13 is a front view of an example battery access port containing an example battery, according to some embodiments.

Although FIGS. 1, 3, and 12 show some embodiments in which the enclosure 110 has a single battery access port 215 formed therein, it should be understood that other embodiments might include multiple battery access ports. For example, some embodiments might include 2 battery access ports or more battery access ports. In some embodiments, the battery is rechargeable and configured to be recharged when the rugged indoor/outdoor television cart 100 is connected to an external source of power. In some embodiments, the battery is removable from the rugged indoor/outdoor television cart 100 to enable a fully charged battery to be swapped into the cart for a lesser charged battery.

In some embodiments, a plurality of LEDs 230, a multicolored LED, or other light indicators are included on the front surface of the battery 220 or on the enclosure 110 to enable the charged state of the battery to be discerned. By changing the state of the LEDs, for example by causing different numbers of LEDs to be illuminated or to cause different color LEDs to be illuminated, it is possible to indicate how much charge remains in the battery.

Figure 14:
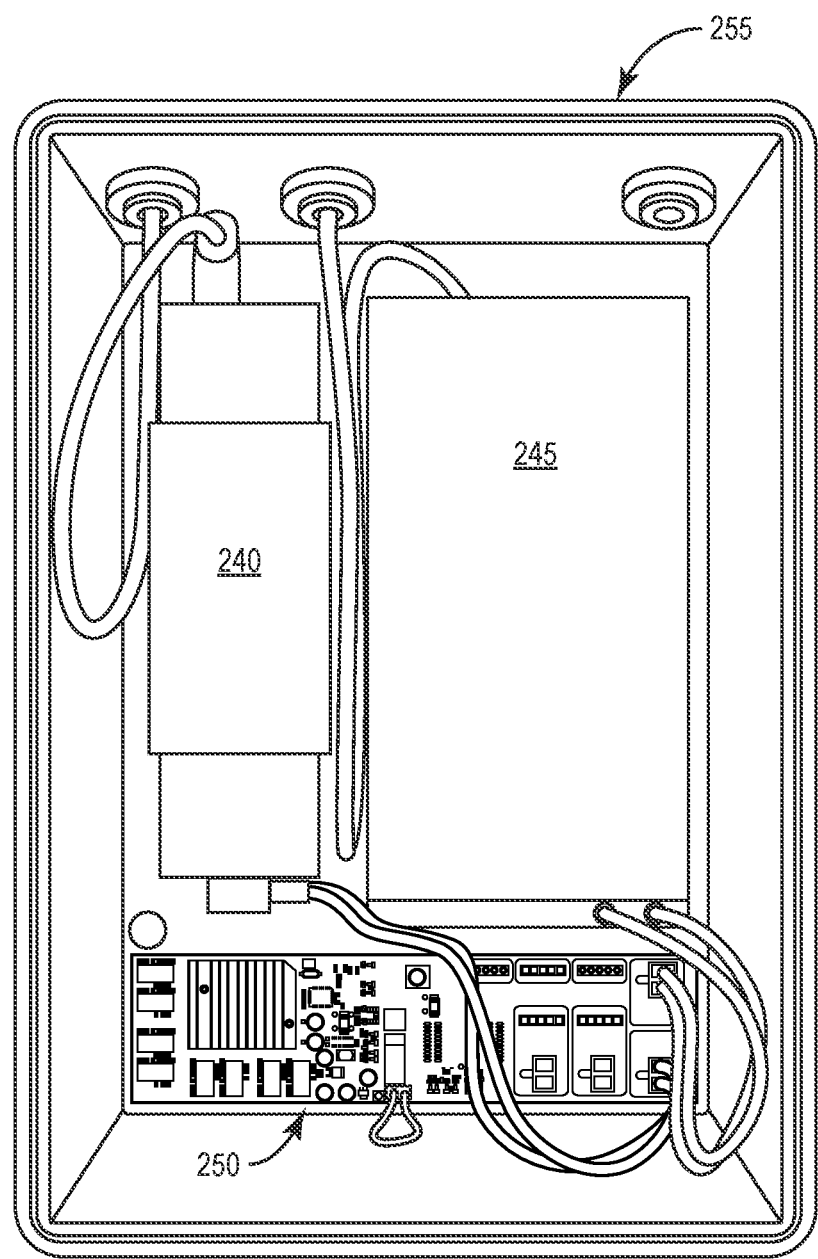
FIG. 14 is a view of an example battery power system, according to some embodiments.

In some embodiments, a battery power system is provided, an example of which is shown in FIG. 14. As shown in FIG. 14, in some embodiments, the battery power system has a power supply 240 configured to convert AC power into DC power, an DC-AC power inverter 245 configured to convert DC power into AC power, and a printed circuit board 250.

When a battery is inserted into the battery access port 215 and the television is turned on, the printed circuit board 250 causes power from the battery to be applied to the DC-AC power inverter 245. An example DC-AC power inverter is the NTS-450 power inverter that is commercially available from Mean Well™ and designed to convert 12V DC into up to 450 Watt of 120V AC output power. The DC-AC power inverter 245 converts the DC power from the battery to AC power, which is supplied to the television 105. In this manner, the battery is able to be used to run the television while the rugged indoor/outdoor television cart 100 is not connected to an external source of power. For example, if the rugged indoor/outdoor television cart 100 is being used on a football field in connection with football practice, it may be impractical or dangerous to run an extension cord out to the sideline of the football field. By providing a rugged indoor/outdoor television cart 100 with a battery power system 235, it thus becomes possible to operate a television 105 in areas that do not have access to an external source of power. For example, a coach might want to have a group of players run a particular play, and then show the group of players a video of the play on the television 105. By providing a rugged indoor/outdoor television cart 100 with a battery power system 235, it becomes possible to do this without leaving the athletic field, and without requiring the use of extension cords.

Optionally, the DC-AC power inverter 245 may also be used to supply AC power to one or more auxiliary outlets at a surface of the enclosure 110 or within the enclosure 110. Since the rugged indoor/outdoor television cart 100 is intended to be used outside, in some embodiments the auxiliary outlets are Ground Fault Interrupt (GFI) protected and disposed in an outlet box having a weatherproof in-use electrical outlet cover or using a weatherproof outlet strip.

When a battery is inserted into the battery access port 215 and the rugged indoor/outdoor television cart 100 is plugged into an external source of AC power, such as mains power available at a wall outlet, the power supply 240 converts the AC power to DC power. The printed circuit board 250 causes DC power from power supply 240 to be supplied to the battery 220, to thereby enable the battery 220 to be charged while the battery is contained in the battery access port 215. It should be understood that the battery 220 can also be removed from the battery access port 215 and charged using a charging system external of the rugged indoor/outdoor television cart 100. For example, in some embodiments a dual battery floor mounted charger can be used to charge two batteries simultaneously.

When a battery is inserted into the battery access port 215 and the rugged indoor/outdoor television cart 100 is plugged into an external source of AC power such as mains power available at a wall outlet, the manner in which power is supplied to the television 105 will depend on the particular implementation. In some embodiments, power is always provided to the television through the DC-AC power inverter 245. Accordingly, if the television is turned on, power from the battery is sent through the DC-AC power inverter to power the television. Power received from the external power source is converted by the power converter 240 and used to charge the battery 220 while charge from the battery is being used to run the television. Alternatively, in some embodiments if power is available from an external power source, a portion of the power from the external power source is applied directly to the television 105 to directly power the television 105, and a second portion of the power from the external power supply is used to charge the battery 220.

In some embodiments, electrical components of the battery power system 235 such as the power supply 240, DC-AC power inverter 245, and printed circuit board 250 are disposed in a waterproof case 255. The waterproof case 255 may be formed to include a plastic base with a lid that closes over the plastic base to form a water-tight seal with the base. In some embodiments, thermal management of the electrical components is implemented by forming one or more ventilation holes in the waterproof case 255 to allow heat to escape from the waterproof case. The ventilation holes may be attached to suitable structures, such as pipes with a J-bend, that will prevent water from entering the waterproof case through the ventilation holes. Optionally, active cooling such as through the use of a fan may be implemented to increase air circulation associated with thermal management.

Figure 9:
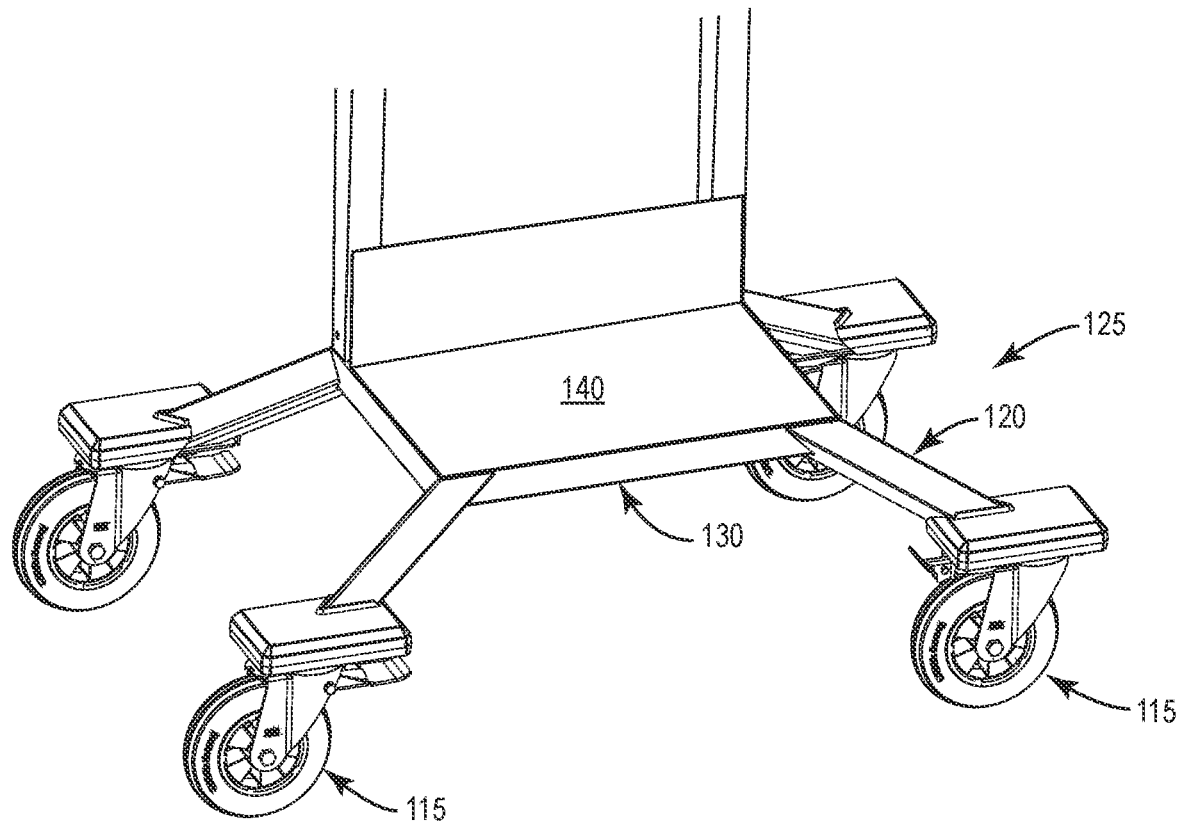
FIG. 9 is a front perspective view of an example base of an example rugged indoor/outdoor television cart showing a base plate, four legs, and example casters, according to some embodiments.

As shown in FIG. 9, in some embodiments the frame 130 is provided with a shelf 140. For example, in some embodiments as shown in FIGS. 5 and 6, the rugged indoor/outdoor television cart is configured to not include an enclosure designed to house a battery power system. In some embodiments of this nature, shelf 140 may be formed on base 125, for example by welding the shelf 140 to the frame 130 or securing the shelf to the frame 130 using removable fasteners such as machine screws or bolts. Providing a shelf 140 may be advantageous, for example in situations where it is desirable to provide a platform to support a laptop computer or other electronic devices, and in situations where an external source of power is readily available and, hence, a battery power source is not required.

In some embodiments, the enclosure 110 that is designed to house a battery power system is a removable component that may be selectively attached to shelf 140 to configure the rugged indoor/outdoor television cart either to be used with an external source of power, or to be used independent of an external source of power. In some embodiments removable fasteners such as straps, clips, screws, or bolts are used to semi-permanently attach the enclosure 110 to the shelf 140, while also enabling the enclosure 110 to be easily removable from the shelf 140, thus enabling the rugged indoor/outdoor television cart to be reconfigured depending on the intended use of the cart.

Although the figures show an example television mounted on the rugged indoor/outdoor television cart in a horizontal orientation, in which the long dimension of the television is parallel to the ground, it should be understood that the television may also be oriented in a vertical orientation, such that the long dimension of the television is perpendicular to the ground.

A number of implementations have been described. Nevertheless, it will be understood that additional modifications may be made without departing from the scope of the inventive concepts described herein, and, accordingly, other implementations are within the scope of the following claims.

What is claimed is:

1. A rugged indoor/outdoor television cart, comprising:
   a base frame;
   four legs radially extending from the frame, each of the four legs being connected at a proximal end to the base frame and being connected at a distal end to a respective castor, each of the four legs extending upward from the castor toward the base frame at a positive angle relative to a flat surface, when the rugged indoor/outdoor television cart is placed on the flat surface;
   at least one vertical upright extending from the base frame to support a television in an elevated state above the base frame;
   a bracket mounting system connected to the vertical upright, the bracket mounting system including a mounting plate and a side plate, the mounting plate having a set of apertures to enable connection between the bracket mounting system and the television, the bracket mounting system further including at least one television mounting and stabilizing bar that is connected to the bracket mounting system and configured to engage top and bottom edges of the television when the television is connected to the mounting plate.

2. The rugged indoor/outdoor television cart of claim 1, wherein the at least one vertical upright includes two vertical uprights extending from the base frame, and wherein the bracket mounting system includes two side plates and two television mounting and stabilizing bars.

3. The rugged indoor/outdoor television cart of claim 2, wherein each television mounting and stabilizing bar has a top claw configured to engage a top edge of the television and a bottom edge configured to engage a bottom edge of the television.

4. The rugged indoor/outdoor television cart of claim 3, further comprising padding material on an interior surface of each of the top claw and bottom claw to provide a firm and resilient engagement between the claws and the respective edges of the television.

5. The rugged indoor/outdoor television cart of claim 2, wherein the each television mounting and stabilizing bar is formed from two pieces such that a distance between the top and bottom claws is adjustable to enable the television mounting and stabilizing bars to accommodate televisions with different vertical dimensions.

6. The rugged indoor/outdoor television cart of claim 1, wherein the bracket mounting system is pivotably connected to the vertical upright to enable an angle of television screen to be adjusted relative to the vertical upright.

7. The rugged indoor/outdoor television cart of claim 6, wherein the bracket mounting system is pivotably connected to the vertical upright to enable an angle of television screen to be adjusted relative to the vertical upright about an axis of rotation that is horizontal.

8. The rugged indoor/outdoor television cart of claim 1, further comprising a battery power system, the battery power system having a removable rechargeable battery and a DC-AC power inverter to receive DC power from the removable rechargeable battery and create 120 volt AC power to be provided at an outlet to be supplied to the television, when the television is mounted to the rugged indoor/outdoor television cart.

9. The rugged indoor/outdoor television cart of claim 8, wherein the battery power system further includes a AC-DC power transformer configured to receive AC power, convert the AC power to DC power, and apply the DC power to the battery to provide charging power to the battery.

10. The rugged indoor/outdoor television cart of claim 1, further comprising a first handle connected to the base and a second handle connected to the vertical upright.

11. The rugged indoor/outdoor television cart of claim 1, wherein each of the four legs extending upward from the castor toward the base frame at an angle of approximately between 20 and 45 degrees relative to the flat surface.

12. The rugged indoor/outdoor television cart of claim 11, wherein each of the four legs extending upward from the castor toward the base frame at an angle of approximately between 25 and 35 degrees relative to the flat surface.

13. The rugged indoor/outdoor television cart of claim 12, wherein each of the four legs extending upward from the castor toward the base frame at an angle of approximately 30 degrees relative to the flat surface, when rounding to the nearest two degrees.

14. The rugged indoor/outdoor television cart of claim 1, further comprising a sun shade connected to a top end of the at least one vertical upright, the sun shade having an extension positioned above a top edge of the television and a length to extend out in front of the television to at least partially shade the television from an overhead source of light.

15. The rugged indoor/outdoor television cart of claim 1, further comprising a shelf connected to a top end of the at least one vertical upright and positioned to be at an elevation higher than a top edge of the television.

* * * * *